(12) United States Patent
Cheung et al.

(10) Patent No.: US 7,878,401 B2
(45) Date of Patent: Feb. 1, 2011

(54) MULTIPLE BARCODE DETECTION

(75) Inventors: Eric Lap Min Cheung, Epping (AU); Stephen Farrar, Telopea (AU); Nicole Ai Ling Lam, Lane Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 11/937,140

(22) Filed: Nov. 8, 2007

(65) Prior Publication Data
US 2008/0149722 A1 Jun. 26, 2008

(30) Foreign Application Priority Data
Dec. 22, 2006 (AU) ............................... 2006252254

(51) Int. Cl.
G06K 7/10 (2006.01)
G06K 5/04 (2006.01)
G06K 9/36 (2006.01)
G06K 9/80 (2006.01)
G06K 9/18 (2006.01)
G08C 21/00 (2006.01)
G06F 17/00 (2006.01)
G06F 19/00 (2006.01)

(52) U.S. Cl. .............................. 235/462.07; 235/462.1; 235/462.09; 235/462.15

(58) Field of Classification Search ................. 235/462, 235/462.07, 462.08, 462.1, 462.25, 462.22, 235/462.04; 382/183, 184, 192, 193, 194, 382/197, 199, 201, 176, 226, 144
See application file for complete search history.

(56) References Cited

U.S. PATENT DOCUMENTS 5,453,600 A * 9/1995 Swartz .................. 235/462.04

(Continued)

FOREIGN PATENT DOCUMENTS

EP    1 509 034    2/2005

(Continued)

OTHER PUBLICATIONS

Abridgement to the Publication of Australian Patent No. 2006252254, Mar. 5, 2009.

*Primary Examiner*—Thien M. Le
*Assistant Examiner*—Thien T Mai
(74) *Attorney, Agent, or Firm*—Fitzpatrick, Cella, Harper & Scinto

(57) ABSTRACT

Disclosed is a method of decoding a first barcode and a second barcode, different from the first barcode. The barcodes have typically been printed on a page and are derived from image scanning. The first barcode comprises a plurality of marks modulated about a first grid to redundantly encode data and the second barcode comprising a plurality of marks modulated about a second grid. The method estimates (810) the first grid from a bitmap representation (805) of at least a portion of the page, using modulated marks contained therein. The method determines (820) a first barcode region from the first grid, the first barcode region being a portion of the first barcode, followed by estimating a second grid from the bitmap representation, using modulated marks contained therein. The method determines a second barcode region from the second grid, the second barcode region being a portion of the second barcode, and then decodes (830) the first and second barcode regions using the first and second grids respectively to derive the first and second barcodes.

18 Claims, 26 Drawing Sheets

U.S. PATENT DOCUMENTS

| | | | |
|---|---|---|---|
| 5,546,474 A * | 8/1996 | Zuniga | 382/176 |
| 5,929,423 A * | 7/1999 | Boersma et al. | 235/462.16 |
| 6,548,768 B1 | 4/2003 | Pettersson et al. | |
| 6,708,884 B1 * | 3/2004 | Su et al. | 235/462.09 |
| 6,845,915 B2 * | 1/2005 | Krichever et al. | 235/462.22 |
| 7,028,902 B2 * | 4/2006 | Xu et al. | 235/462.1 |
| 7,050,631 B2 * | 5/2006 | Bian et al. | 382/183 |
| 7,426,455 B1 * | 9/2008 | Antony | 382/226 |
| 7,745,069 B2 * | 6/2010 | Rankin et al. | 382/144 |
| 2002/0012444 A1 * | 1/2002 | Nishikawa et al. | 382/100 |
| 2002/0044138 A1 | 4/2002 | Edso et al. | |
| 2003/0042312 A1 * | 3/2003 | Cato | 235/462.25 |
| 2007/0003127 A1 * | 1/2007 | Nakano et al. | 382/144 |
| 2008/0050040 A1 * | 2/2008 | Geers et al. | 382/144 |

FOREIGN PATENT DOCUMENTS

| | | |
|---|---|---|
| JP | 8-106517 | 4/1996 |
| JP | 11-231739 | 8/1999 |
| JP | 2003-511762 | 3/2003 |

* cited by examiner

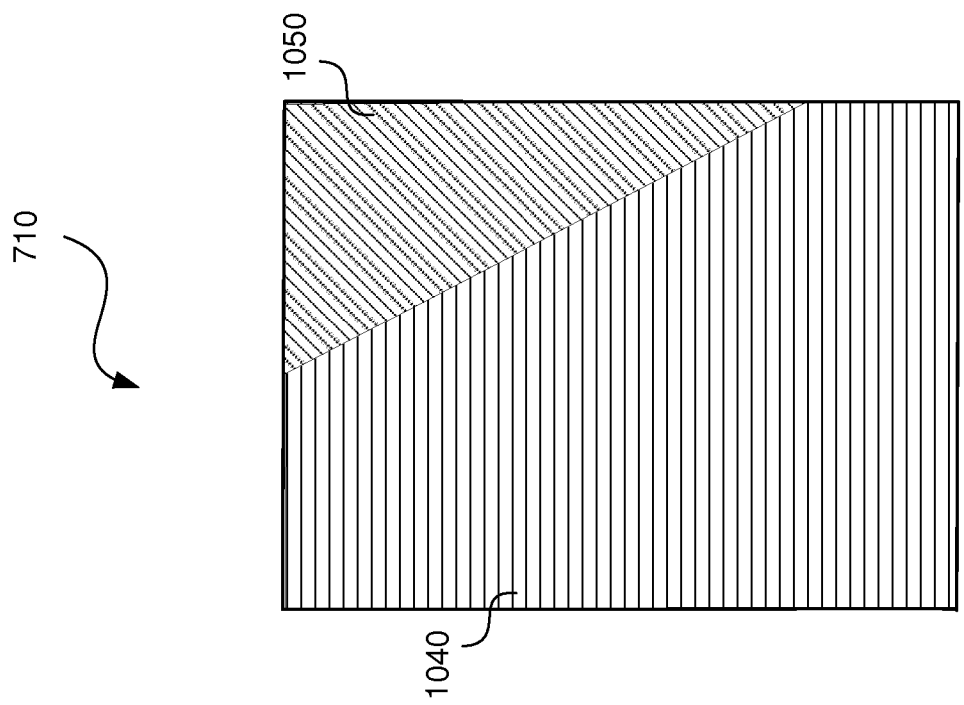
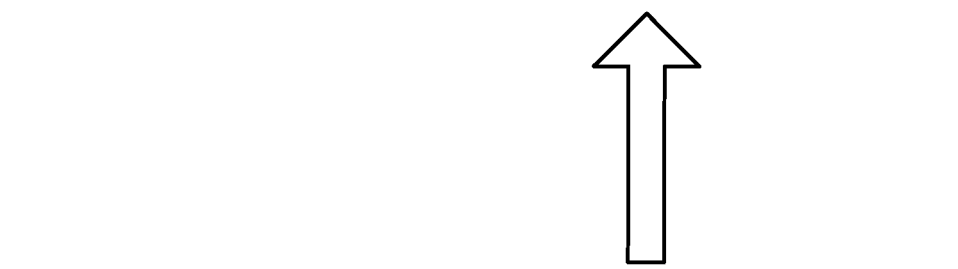
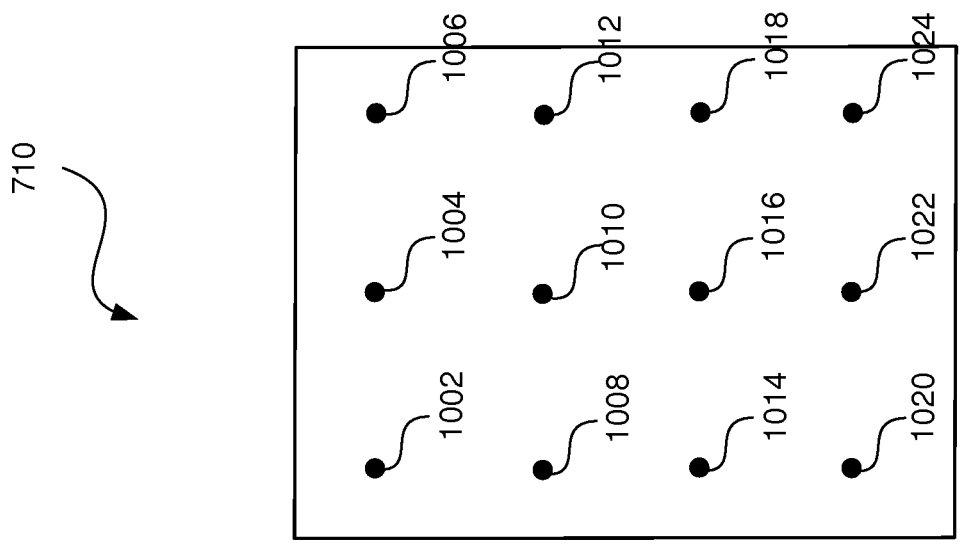
Fig. 10B
Fig. 10A

US 7,878,401 B2

MULTIPLE BARCODE DETECTION

FIELD OF INVENTION

The present invention relates to detecting data encoded in an image and, in particular, to detecting more than one set of encoded data in an image.

CLAIM TO PRIORITY

This application claims the benefits of Australian Patent Application AU 2006-252254filed Dec. 22, 2006, the entire contents of which being incorporated herein by reference.

BACKGROUND

Several methods for preventing unauthorized copying of image data exist. These methods are usually based on locating fixed patterns or indicia in the image being copied. Alternatively, some prior art have indicia that encode data messages, where the indicia have alignment or synchronizing marks for detection in a decoder. Other prior art detects several 1-dimensional barcodes on a page.

Additionally, methods exist for embedding and detecting more than one watermark included in an image, in order to determine authenticity of an image. These methods involve embedding multiple watermarks, which have different characteristics, onto an image. The watermark characteristics are chosen such that the watermarks will be affected in different manners if the image is subsequently copied. This method is limited to distinguishing original documents from copies and does not lend itself to detecting arbitrarily placed watermarks on an image—as is common with copy attacks.

SUMMARY

In accordance with one aspect of the present invention there is provided a method of decoding a first barcode and a second barcode, different from the first barcode, the barcodes having been printed on a page, the first barcode comprising a plurality of marks modulated about a first grid to redundantly encode data and the second barcode comprising a plurality of marks modulated about a second grid. The method comprises:

(a) estimating the first grid from a bitmap representation of at least a portion of the page, using modulated marks contained therein;

(b) determining a first barcode region from the first grid, the first barcode region being a portion of the first barcode;

(c) estimating a second grid from the bitmap representation, using modulated marks contained therein;

(d) determining a second barcode region from the second grid, the second barcode region being a portion of the second barcode; and (e) decoding the first and second barcode regions using the first and second grids respectively to derive the first and second barcodes.

Typically, the first and second barcode grids are different. Also, modulation is desirably spatial modulation. Generally, the first barcode adjoins the second barcode.

Preferably steps (c) and (e) estimate the grids using confidence measures associated with redundant ones of each said grid respectively. Typically, estimating the grids comprises the steps of:

(i) identifying starting points for each grid;
(ii) detecting grid spacing and orientation for each identified starting point; and
(iii) growing each said grid using said confidence measure.

Further, step (iii) may comprise the steps of:

(iii-a) defining at least one territory associated with said grid, said territory having dimensions larger than a smallest grid spacing;
(iii-b) calculating a confidence value for each said starting point associated with a grid intersection closest to a given pixel location in said territory;
(iii-c) selecting a grid intersection with a highest one of said confidence values;
(iii-d) identifying a grid that is associated with the selected grid intersection;
(iii-e) determining confidence values for neighbours of said selected grid intersection for said identified grid; and
(iii-f) repeating step (iii-c) to (iii-e) to thereby identify each grid intersection of said grid.

Other aspects are also disclosed.

BRIEF DESCRIPTION OF THE DRAWINGS

At least one embodiment of the present invention will now be described with reference to the drawings in which:

FIG. 10A illustrates defining the starting points on an example image;

FIG. 10B illustrates the grids identified on an example image;

DETAILED DESCRIPTION INCLUDING BEST MODE

The present disclosure relates to decoding several dot patterns in an image. Each dot pattern is a modulated grid of dots, which encodes at least a data message. It is notable that, in a preferred implementation, that each dot pattern need not have any alignment or synchronizing marks. However, the present implementation is nevertheless able to detect multiple dot patterns that do contain alignment or synchronizing marks.

A preferred implementation is practiced in software embedded in or linked to a photocopier. When an image containing dot patterns is attempted to be copied using a photocopier, the image is analysed in order to detect multiple dot patterns. The decoded messages determine whether the image can be reproduced or not. For example, if out of the four messages decoded from an input image, three messages allow copying, while one message prohibits copying, then the input image is not copied. Furthermore, an alternate embodiment may only reproduce the dot pattern regions that allow copying, omitting the dot pattern regions that prohibit copying.

In an alternative implementation, it is possible to visually identify to an operator the dot pattern regions that have been identified by the present embodiment and their associated decoded messages.

Figure 22:
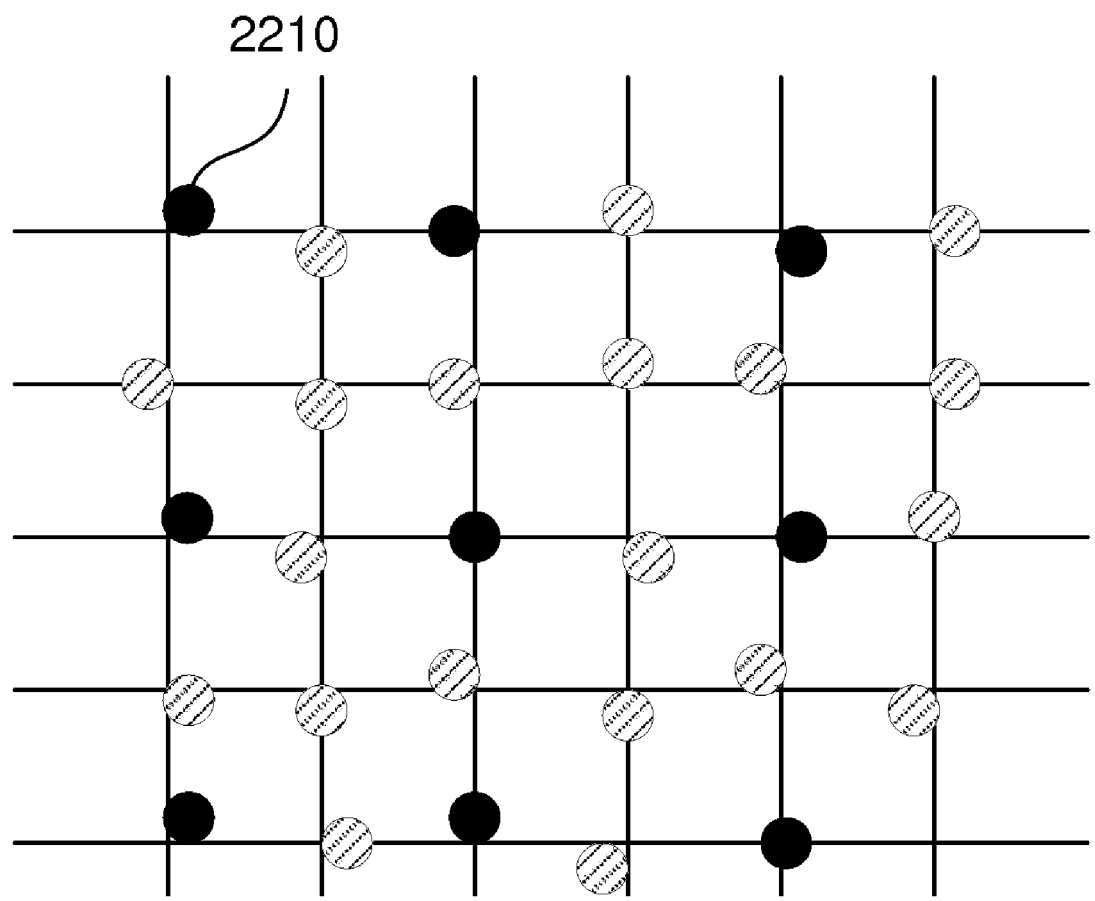
FIG. 22 illustrates an extension to the invention by sub-sampling the dots in a region.
Figure 23:
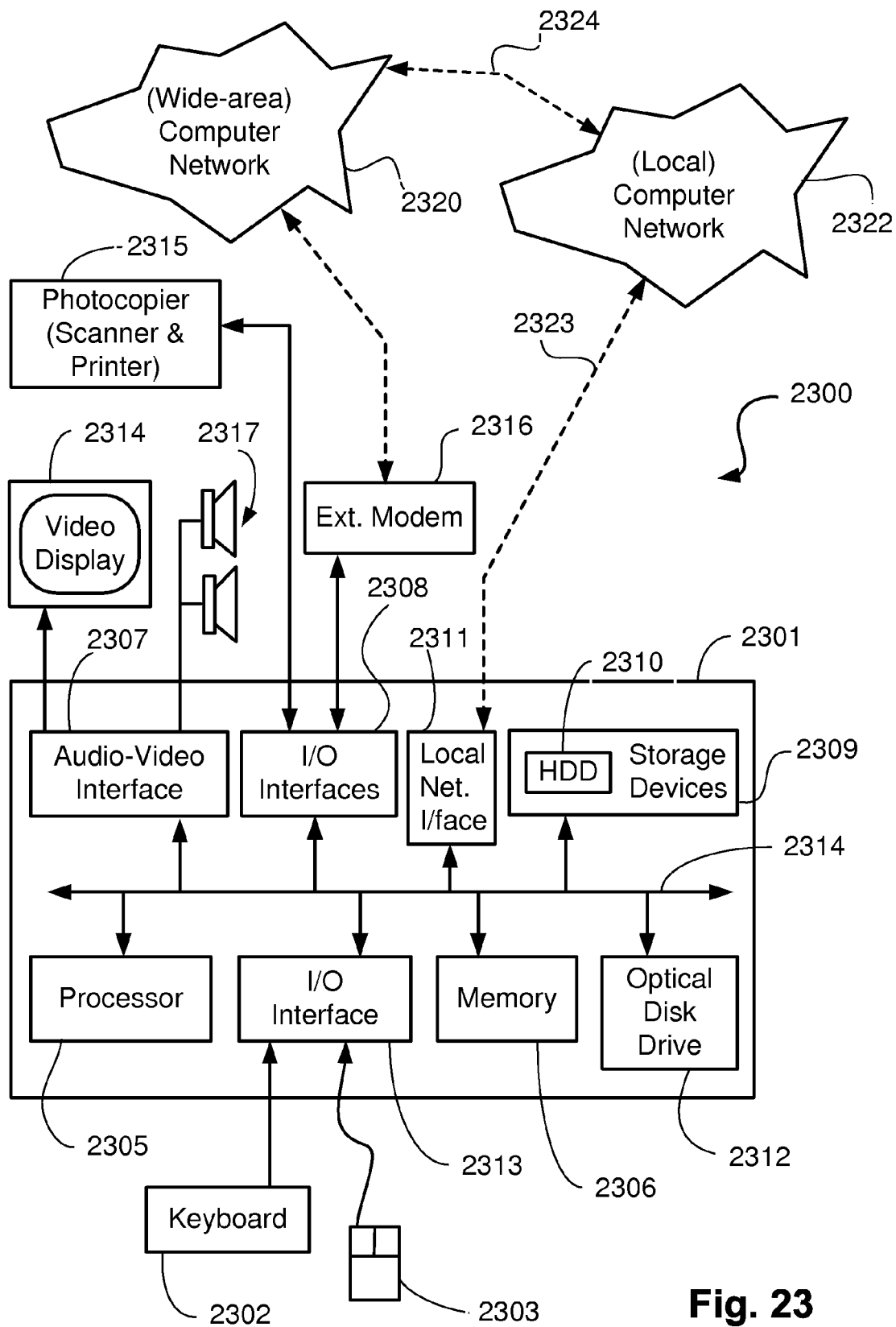
FIG. 23 is a schematic block diagram representation of a computer system upon which the described arrangements may be practised.

The methods to be described may be implemented using a computer system 2300 coupled to a photocopier 2315, such as that shown in FIG. 23 wherein the processes of FIGS. 1-22 may be implemented as software, such as one or more application programs executable within the computer system 2300. The computer system 2300 can thus detect an attempted copying operation and thus control a scanner and printer collectively forming the photocopier 2315 in the copying process. In particular, the steps of method of barcode detection and copy protection are effected by instructions in the software that are carried out within the computer system 2300. The instructions may be formed as one or more code modules, each for performing one or more particular tasks. The software may also be divided into two separate parts, in which a first part and the corresponding code modules performs the detection methods and a second part and the corresponding code modules manage a user interface between the first part and the user. The software may be stored in a computer readable medium, including the storage devices described below, for example. The software is loaded into the computer system 2300 from the computer readable medium, and then executed by the computer system 2300. A computer readable medium having such software or computer program recorded on it is a computer program product. The use of the computer program product in the computer system 2300 preferably effects an advantageous apparatus for barcode detection.

As seen in FIG. 23, the computer system 2300 is formed by a computer module 2301, input devices such as a keyboard 2302 and a mouse pointer device 2303, and output devices including, a display device 2314 and loudspeakers 2317, and also a connection to the photocopier 2315. An external Modulator-Demodulator (Modem) transceiver device 2316 may be used by the computer module 2301 for communicating to and from a communications network 2320 via a connection 2321. The network 2320 may be a wide-area network (WAN), such as the Internet or a private WAN. Where the connection 2321 is a telephone line, the modem 2316 may be a traditional "dial-up" modem. Alternatively, where the connection 2321 is a high capacity (eg: cable) connection, the modem 2316 may be a broadband modem. A wireless modem may also be used for wireless connection to the network 2320. The networks 2320 and 2322 may afford access to other photocopiers that may be desired to be controlled in a similar fashion.

The computer module 2301 typically includes at least one processor unit 2305, and a memory unit 2306 for example formed from semiconductor random access memory (RAM) and read only memory (ROM). The module 2301 also includes an number of input/output (I/O) interfaces including an audio-video interface 2307 that couples to the video display 2314 and loudspeakers 2317, an I/O interface 2313 for the keyboard 2302 and mouse 2303 and optionally a joystick (not illustrated), and an interface 2308 for the external modem 2316 and photocopier 2315. In some implementations, the modem 2316 may be incorporated within the computer module 2301, for example within the interface 2308. The computer module 2301 also has a local network interface 2311 which, via a connection 2323, permits coupling of the computer system 2300 to a local computer network 2322, known as a Local Area Network (LAN). As also illustrated, the local network 2322 may also couple to the wide network 2320 via a connection 2324, which would typically include a so-called "firewall" device or similar functionality. The interface 2311 may be formed by an Ethernet™ circuit card, a wireless Bluetooth™ or an IEEE 802.11 wireless arrangement.

The interfaces 2308 and 2313 may afford both serial and parallel connectivity, the former typically being implemented according to the Universal Serial Bus (USB) standards and having corresponding USB connectors (not illustrated). Storage devices 2309 are provided and typically include a hard disk drive (HDD) 2310. Other devices such as a floppy disk drive and a magnetic tape drive (not illustrated) may also be used. An optical disk drive 2312 is typically provided to act as a non-volatile source of data. Portable memory devices, such optical disks (eg: CD-ROM, DVD), USB-RAM, and floppy disks for example may then be used as appropriate sources of data to the system 2300.

The components 2305, to 2313 of the computer module 2301 typically communicate via an interconnected bus 2304 and in a manner which results in a conventional mode of operation of the computer system 2300 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 2310 and read and controlled in execution by the processor 2305. Intermediate storage of such programs and any data fetched from the networks 2320 and 2322 may be accomplished using the semiconductor memory 2306, possibly in concert with the hard disk drive 2310. In some instances, the application programs may be supplied to the user encoded on one or more CD-ROM and read via the corresponding drive 2312, or alternatively may be read by the user from the networks 2320 or 2322. Still further, the software can also be loaded into the computer system 2300 from other computer readable media. Computer readable media refers to any storage medium that participates in providing instructions and/or data to the computer system 2300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 2314. Through manipulation of the keyboard 2302 and the mouse 2303, a user of the computer system 2300 and the application may manipulate the interface to provide controlling commands and/or input to the applications associated with the GUI(s).

The method of mark detection may alternatively be implemented in dedicated hardware such as one or more integrated circuits performing the functions or sub functions of image processing. Such dedicated hardware may include graphic processors, digital signal processors, or one or more microprocessors and associated memories. Further, whilst described with reference to the computer system 2300 coupled to the photocopier 2315, much of the describe functionality of the computer system 2300 may be incorporated into the photocopier 2315 thus permitting specific local operation.

1. Basic Structure

Figure 1:
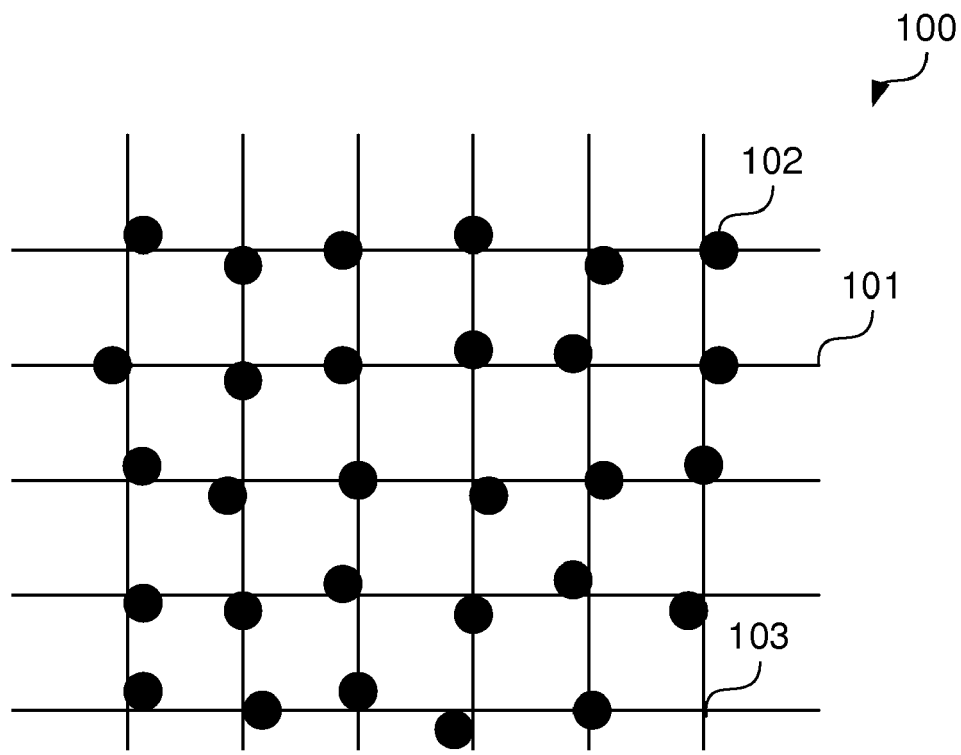
FIG. 1 illustrates an array of dots that have been phase modulated so that they no longer entirely lie on a regular grid.
Figure 2:
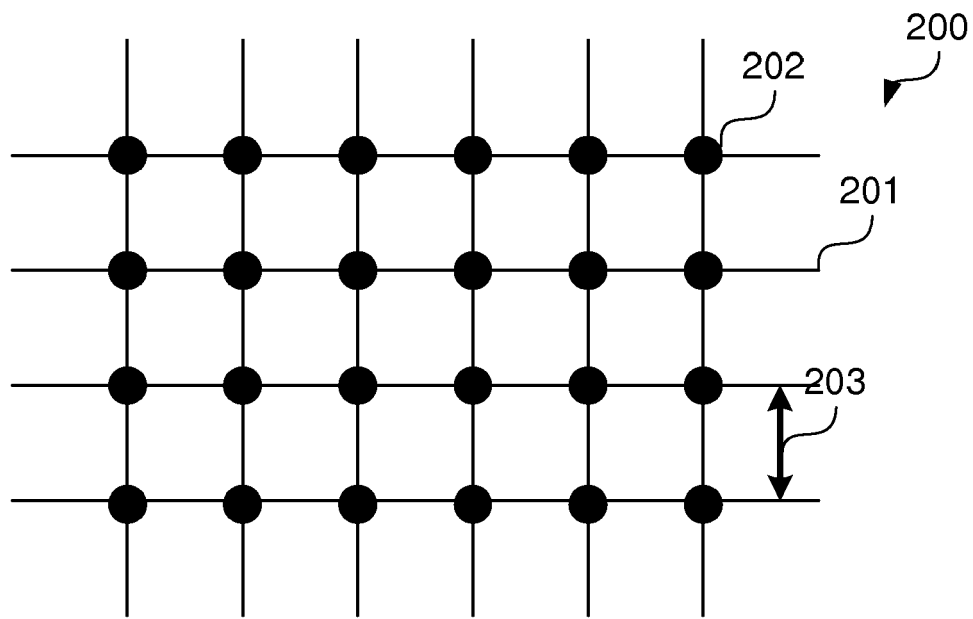
FIG. 2 illustrates a regular array of dots lying on a regular grid.

FIG. 1 shows an enlarged view of the appearance of a modulated grid 100. A modulated grid 100 is formed of a large number of dots 102 that lie close to the intersection points 103 of a square grid 101. Note that it is only the dots 102 that form the visible modulated grid 100, and the grid 101 is illustrated purely for explanation of the location of the dots 102. The appearance of a modulated grid is similar to that of a regular grid of dots, but not identical. FIG. 2 shows the appearance of a regular grid 200 of dots 202 that lie on a square grid 201. The square grid 201 has a pitch 203, herein referred to as "grid spacing".

Figure 20:
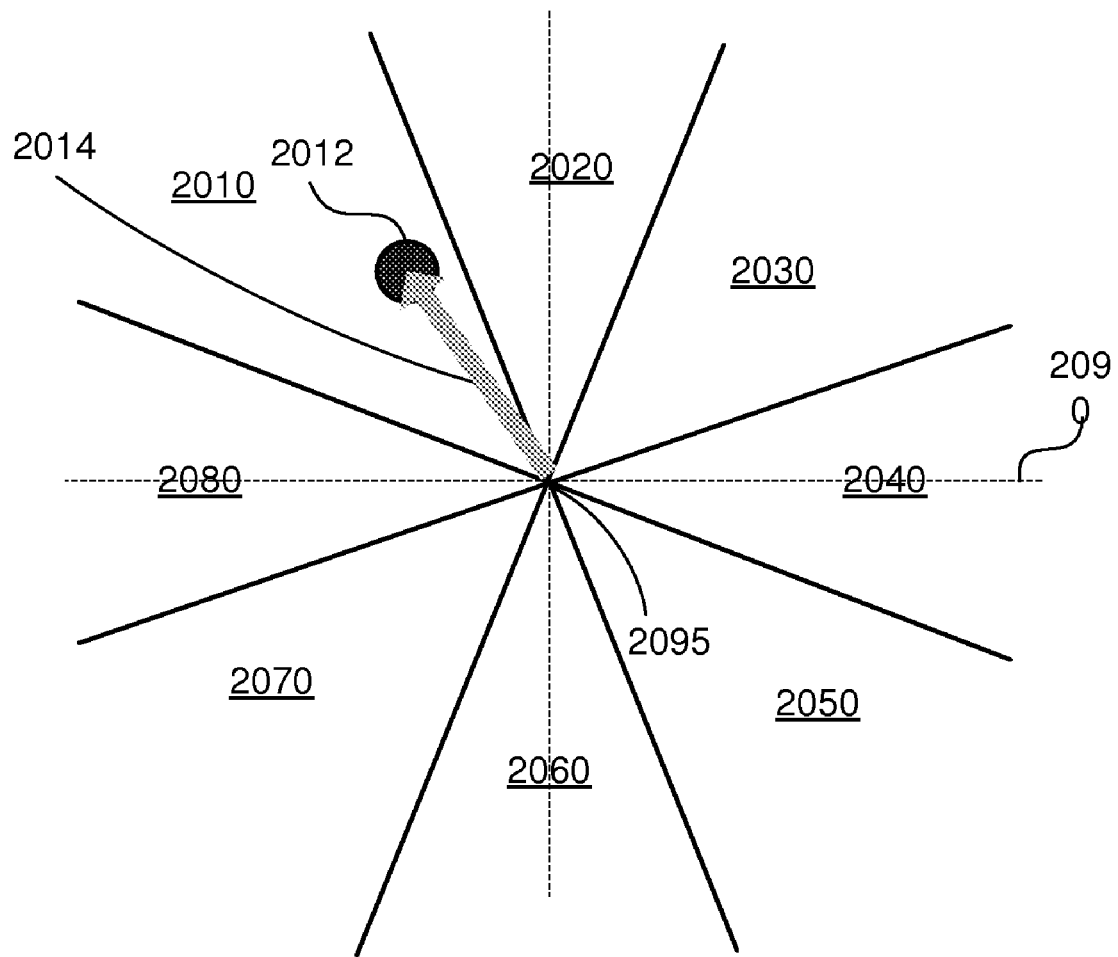
FIG. 20 illustrates the conversion of an aggregated offset vector to its digital data value.

The difference between a regular array 200 of dots 202 in FIG. 2 and a modulated grid 100 in FIG. 1 is that the positions of the dots 102 in the modulated grid 100 of FIG. 1 are slightly modulated away (ie. spatially modulated) from the grid positions that they would occupy if they were part of a truly regular array 200 in FIG. 20. This spatial modulation serves two purposes—the first is that it makes the modulated grid dots 102 slightly less visible than the dots 202 of a regular grid 200. This is because the human visual system is very adept at noticing regular grids. The second purpose of the modulation about the intersections is that a message in the form of digital data can be stored in the modulation of the dots. Thus, the modulated grid may be considered a barcode representation of data that, once printed, forms an image that is able to be scanned and from which the encoded message or barcode may be demodulated. The scanned image typically comprises a bitmap representation of the page, including the redundantly represented barcode encoded information.

Figure 3:
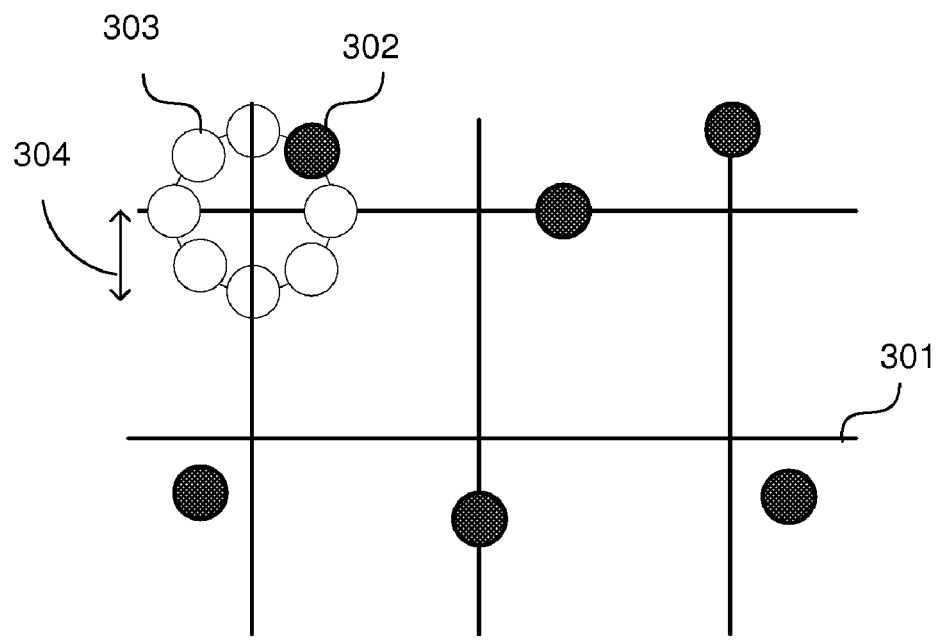
FIG. 3 shows the modulation of the dots in greater detail.

FIG. 3 shows the spatial modulation of the dots in greater detail. In FIG. 3, dots 302 lie close to the intersections of a regular grid 301, and each dot 302 is modulated, to one of eight possible positions 303, about the grid intersections. In this specific case, the eight possible positions for each dot are arranged in a circle centred on the relevant grid intersection. The eight modulation positions are offset from the grid intersection horizontally, vertically or diagonally, the latter being a combination of both horizontally and vertically. The horizontal and vertical distance by which the dots 302 are each offset is termed the modulation quantum 304, herein abbreviated as "mq".

Figure 4:
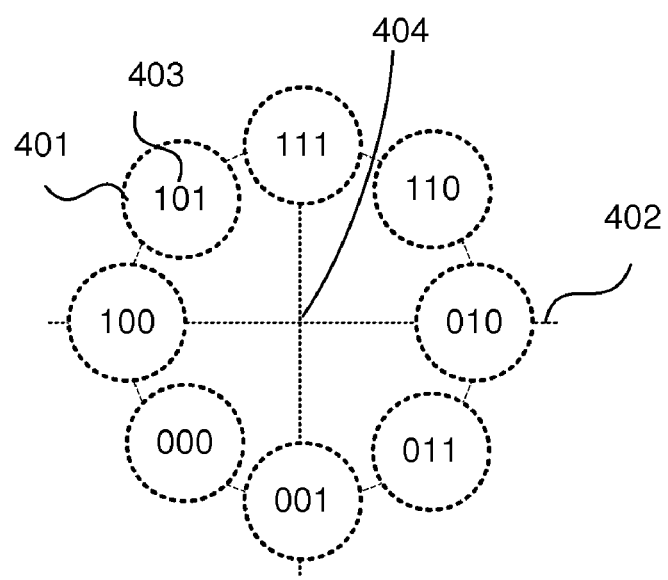
FIG. 4 shows the modulation of the dots in even greater detail.

FIG. 4 shows the eight dot modulation positions 303 in even greater detail. The positions 303 are centred on the grid intersection 404 of a grid 402, and each modulation position, such as position 401, has an associated 3-bit digital code value, such as the value 403. The eight modulation positions (including 401) allow each dot to encode one of eight possible digital code values (including the code value 403 for position 401). This allows a modulated grid to act as a digital data store, with each dot of the modulated grid storing one base-eight digit of data. Ideally, each dot encodes a code value such that the dots are arranged in a gray code in the circle. This facilitates error correction during decoding. FIG. 4 shows the digital code value of each dot in binary. Thus, starting clockwise from code value 403, the dots encode the values: 5, 7, 6, 2, 3, 1, 0 and 4.

Figure 5:
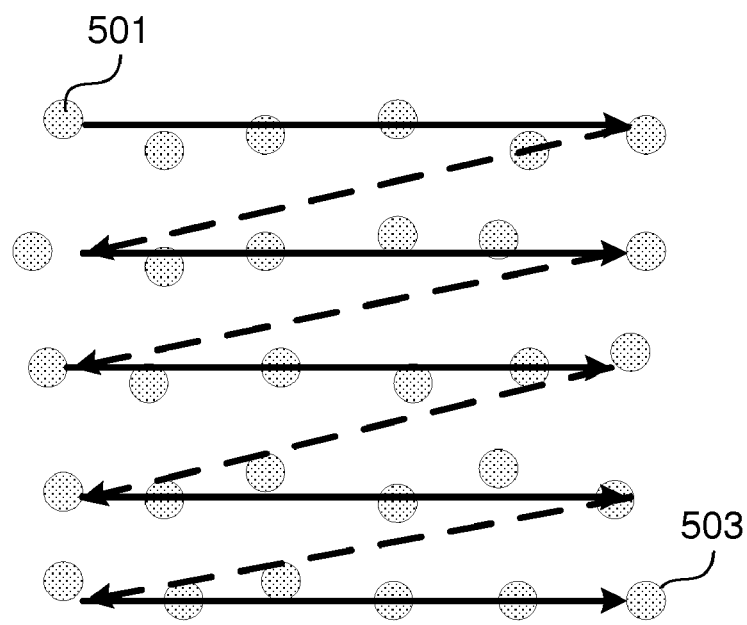
FIG. 5 shows the ordering for the digits of a modulated grid.

The preferred ordering of the digits of the digital data store is the ordering provided by using a rectangular array of dots as shown in FIG. 5. This ordering starts at the topmost, leftmost dot 501 and proceeds left to right and then from top to bottom until the bottommost, rightmost dot 503 is reached. It is of course possible to use other orderings.

2. Encoding

Figure 6:
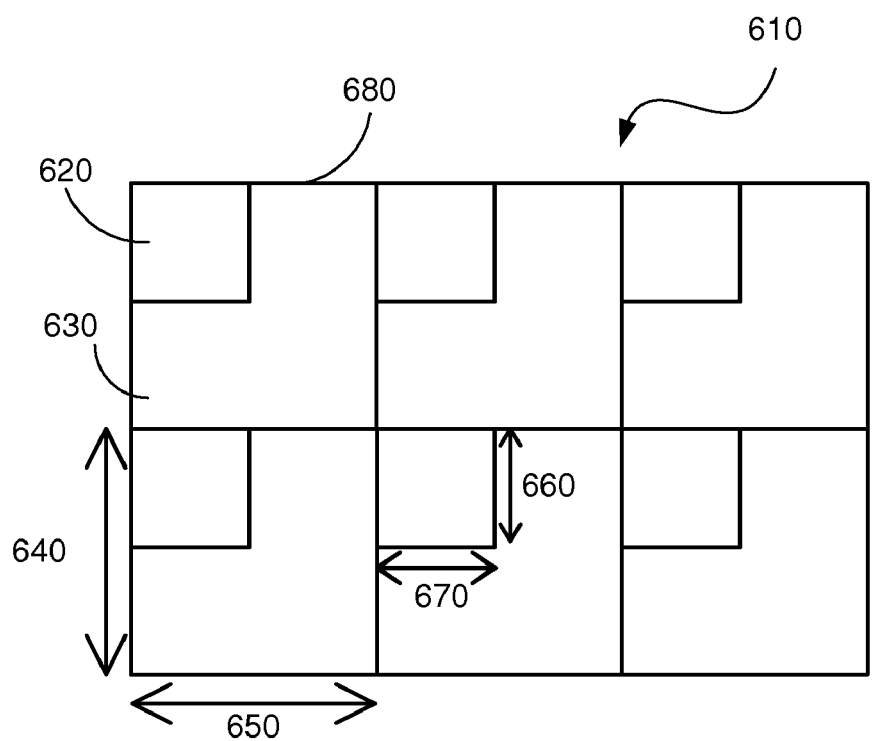
FIG. 6 illustrates the tiling arrangement for encoding data in a dot pattern.

FIG. 6 shows an encoded portion of a document 610 arranged in a tiled manner. The document 610 is composed of a series of tiles 680. The tiles 680 have a predetermined height 640, ty, and width 650, tx, measured in grid squares. Each tile 680 contains a small data portion 620, which encodes a data message in the structure as described above, and an excess portion 630. The small data portion 620, which has a predetermined height 660, cy, and width 670, cx, measured in grid squares, is repeated across the document 610. The excess portion 630 may contain encoded data that may also be tiled across document 610 at a tile rate different from the tile rate of 620. Alternatively, excess portion 630 may contain un-tiled random data. It is possible that cx will equal tx and that cy will equal ty such that the same information is tiled across the document. The tiling permits the data portions to redundantly encode the message across the document. This is desirable because image quality may vary necessitating a redundant encoding. Further, not all parts of a document may be copied and hence it is desirable to have such markings across all major printed portions of the document.

3. Decoding

Figure 7A:
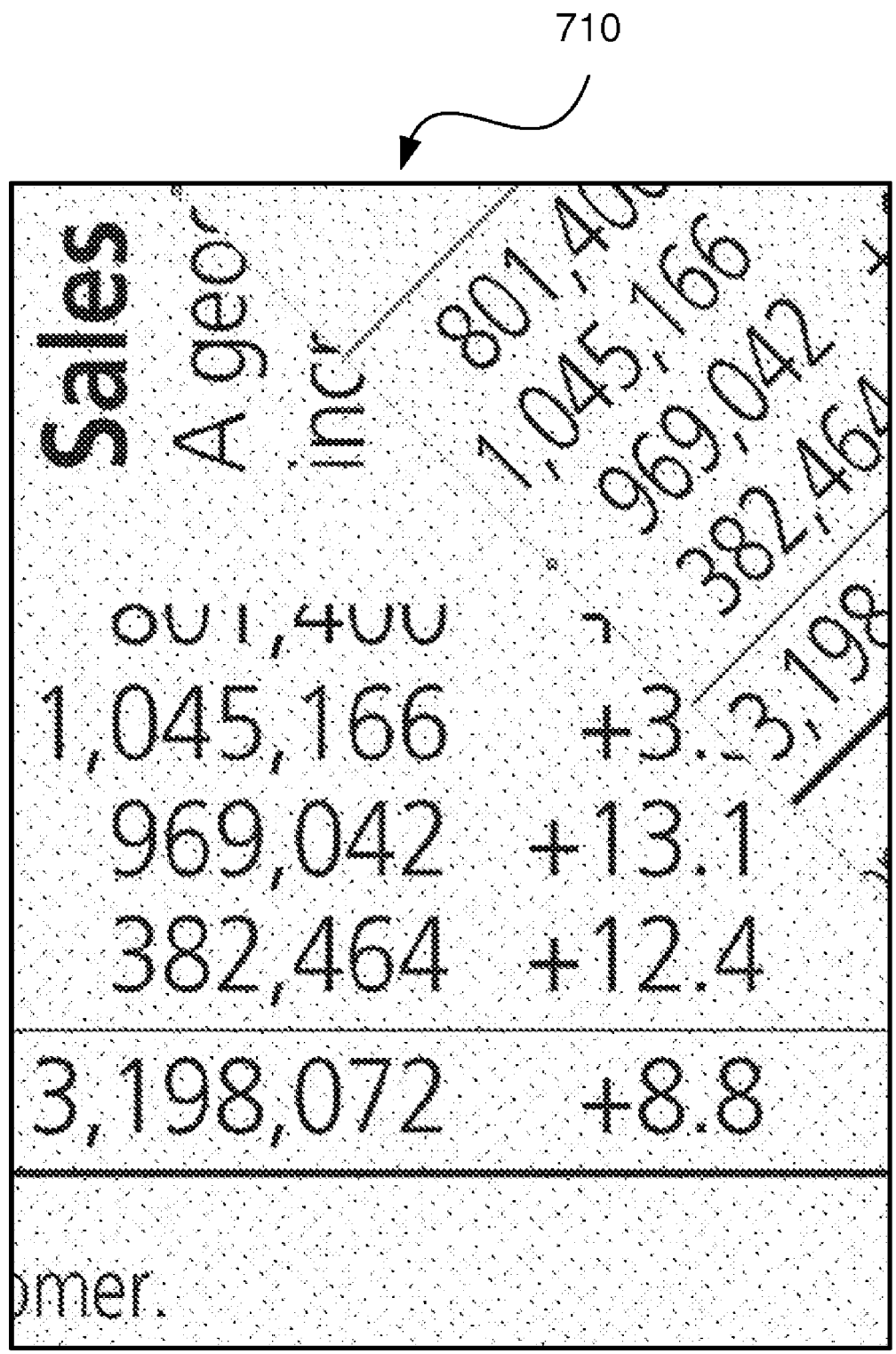
FIG. 7A shows an example of an image with three regions of encoded data.

FIG. 7A shows an example image 710 including a combination of encoded dot patterns that can be decoded by the arrangements presently disclosed. The image 710 may be a bitmap representation obtained by scanning a paper sheet upon which printing had been performed and contains dot patterns that have different orientations and/or dot spacing. In FIG. 7A, all the grids have the same dot-spacing, however, the grid parameters are different. In this particular case the grid parameters differ in that the orientations are different, while the spacing is the same. Further, the image 710 will be observed to have three overt portions of data that appear to have resulted from some overlapping of misaligned but otherwise structurally independent yet adjoining portions of data.

Figure 8:
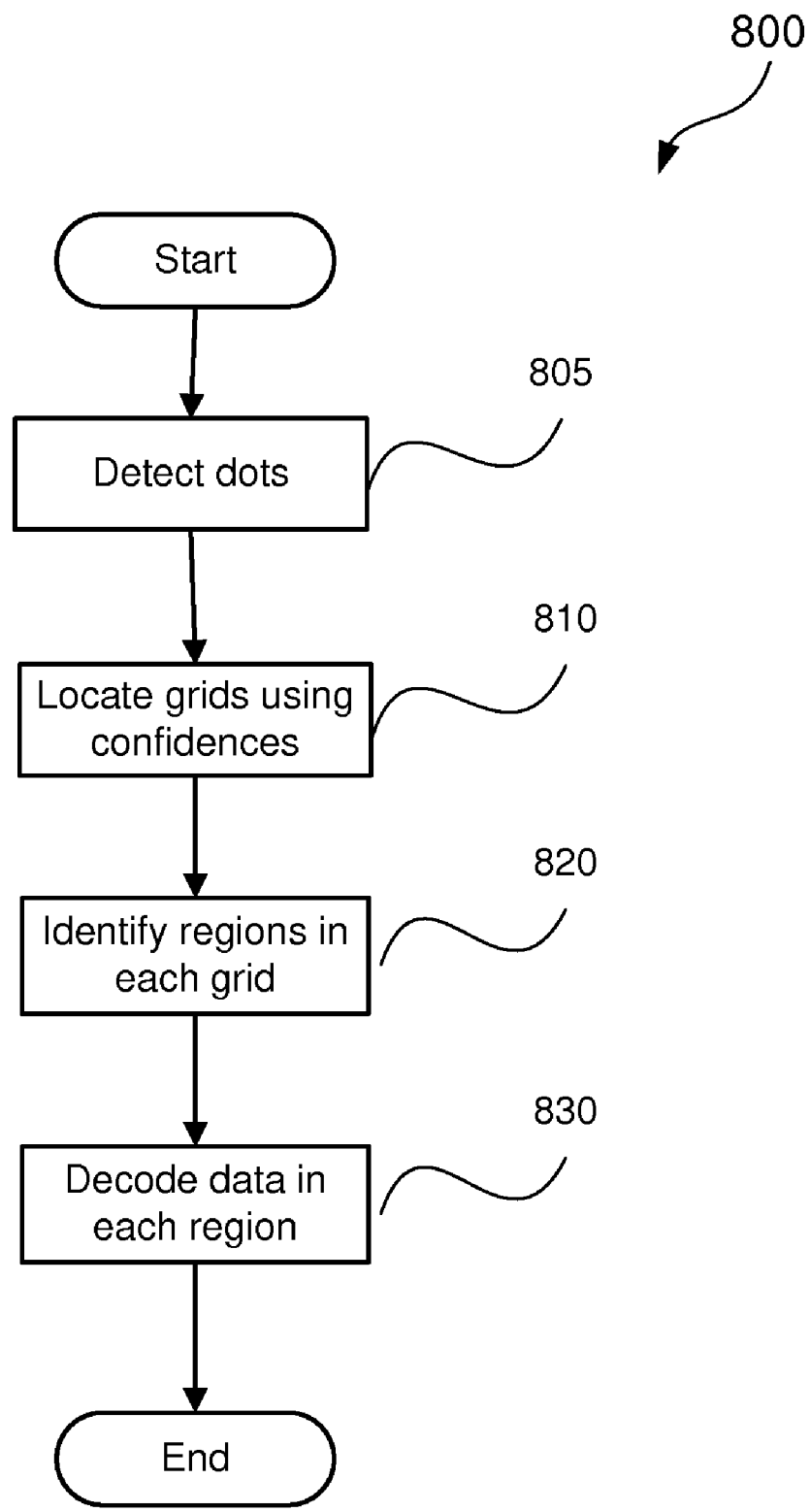
FIG. 8 is a flowchart showing the steps to detect multiple regions of encoded data in an image.

FIG. 8 shows the method 800 of decoding an input image that contains at least one dot pattern. Step 805 takes an input image and detects the dots on the image. In step 805, the dots which comprise the dot pattern are detected, and their positions on the page recorded in a list of coordinate data. Step 805 may be performed using connected component analysis of the scanned image. In such analysis, individual pixels of the image are examined to connect and group those that are spatially adjacent. By analysing the group in terms of its shape, the presence of a mark (ie. a circular dot or generally uniform blob of pixels of the appropriate expected size) can be detected. The centroid of the mark may then be determined to identify a coordinate location corresponding to the detected mark (dot).

Figure 7B:
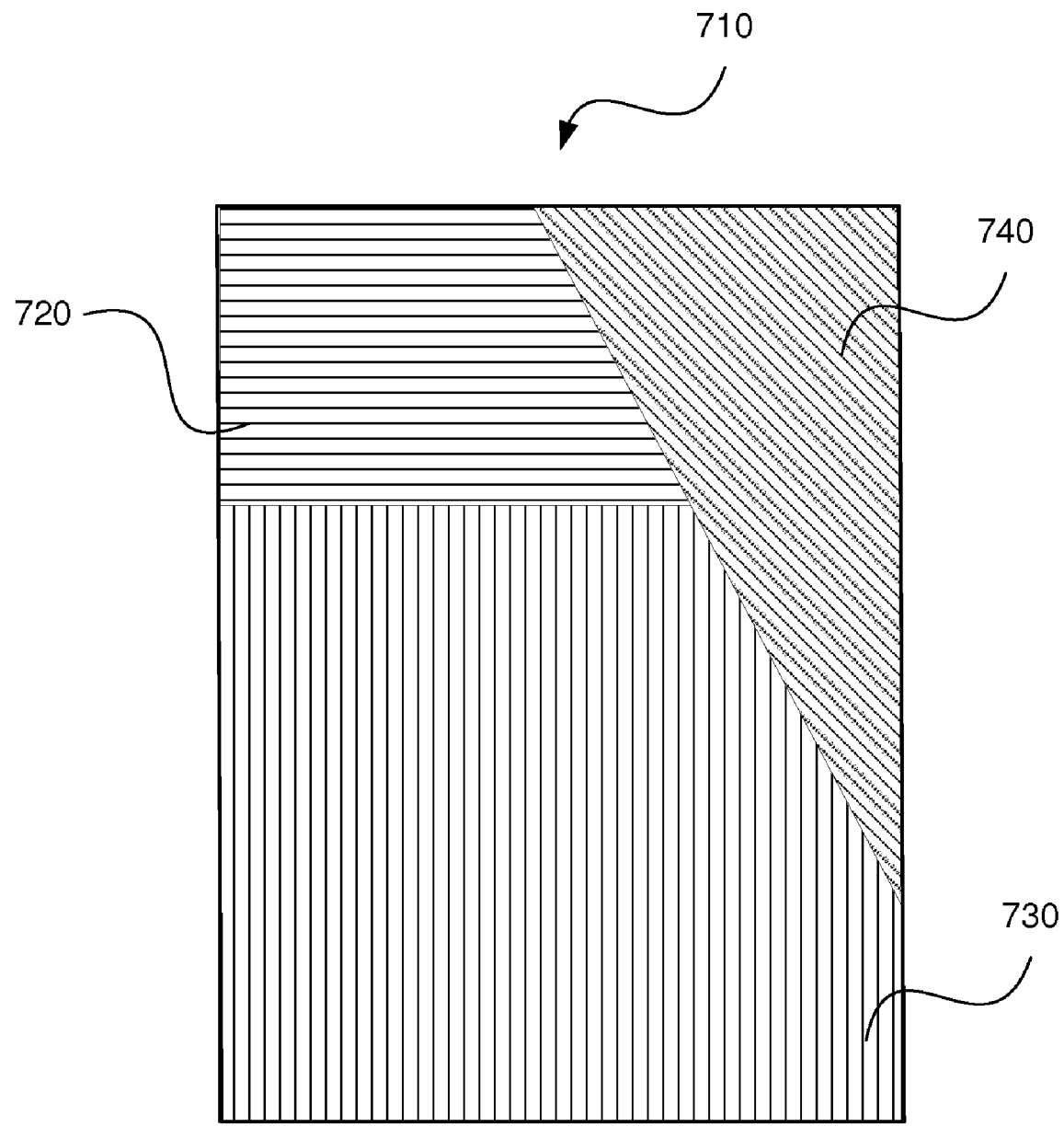
FIG. 7B shows an example of the regions of encoded data in an image that are detected by the presently disclosed arrangements.

Next, step 810 locates the grid intersections of each dot pattern within the image. Each grid identified by step 810 may contain one or more regions. Step 820 identifies the regions within each grid. From the example in FIG. 7A, step 820 will identify the regions 720, 730 and 740 seen in FIG. 7B. FIG. 7B shows a dot pattern 720 which has a horizontal orientation; a dot pattern 730 which has vertical orientation and similar spacing to dot pattern 720; and a dot pattern 740 which has diagonal orientation.

Finally, step 830 decodes each identified region into its original data message, whereupon the method 800 ends.

3.1 Grid Navigation

Figure 9:
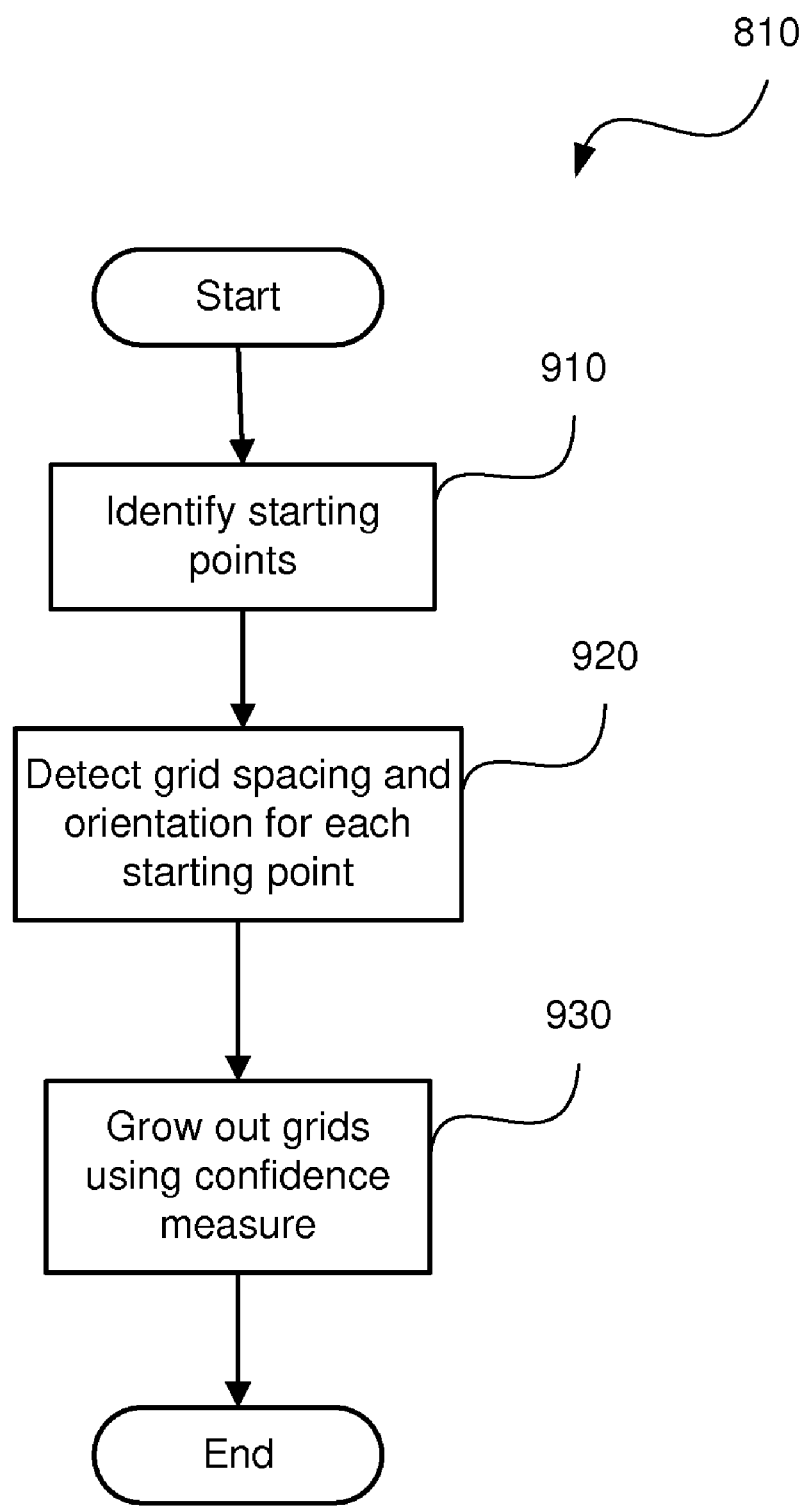
FIG. 9 is a flowchart showing the steps of locating multiple grids of encoded data in an image.

Step 810 is now discussed in greater detail. FIG. 9 shows the method of locating the grids in an image using a confidence measure corresponding to step 810 of FIG. 8. Processing commences at step 910, where multiple starting points are identified on the image. These starting points indicate the locations at which the grids will start growing. Each starting point has a corresponding grid navigator. The starting points may be placed at arbitrary, random locations on the image. However, in a preferred implementation, the starting points are placed at regular intervals, sp, across the image:

$$sp = \frac{dp\_size}{2}$$

where dp_size is the minimum size of the dot pattern that the particular implementation is able to detect. For example, in the preferred implementation, the method is configured to detect dot pattern areas with a minimum size of 1 inch by 1 inch. Thus, for a 600 dpi image, the starting points are placed 300 pixels (or 0.5 inches) apart. That is, dp_size is 1 inch and sp is therefore 0.5 inches.

FIG. 10A and FIG. 10B illustrate the method of locating the grids of all the dot patterns in an image. FIG. 10A illustrates step 910 where 1002, 1004, 1006, 1008, 1010, 1012, 1014, 1016, 1018, 1020, 1022 and 1024 represent the starting points placed at regular intervals across the image 710.

Returning to FIG. 9, for each starting point identified in step 910, step 920 then detects its grid spacing and orientation. The barcode image is partitioned into neighbourhoods, so that each neighbourhood has a starting point at its centre. The neighbourhoods are preferably square shaped, although other shapes are possible. The purpose of these neighbourhoods is to define, for each starting point, the dots which will be used to detect the grid spacing and orientation.

Figure 24:
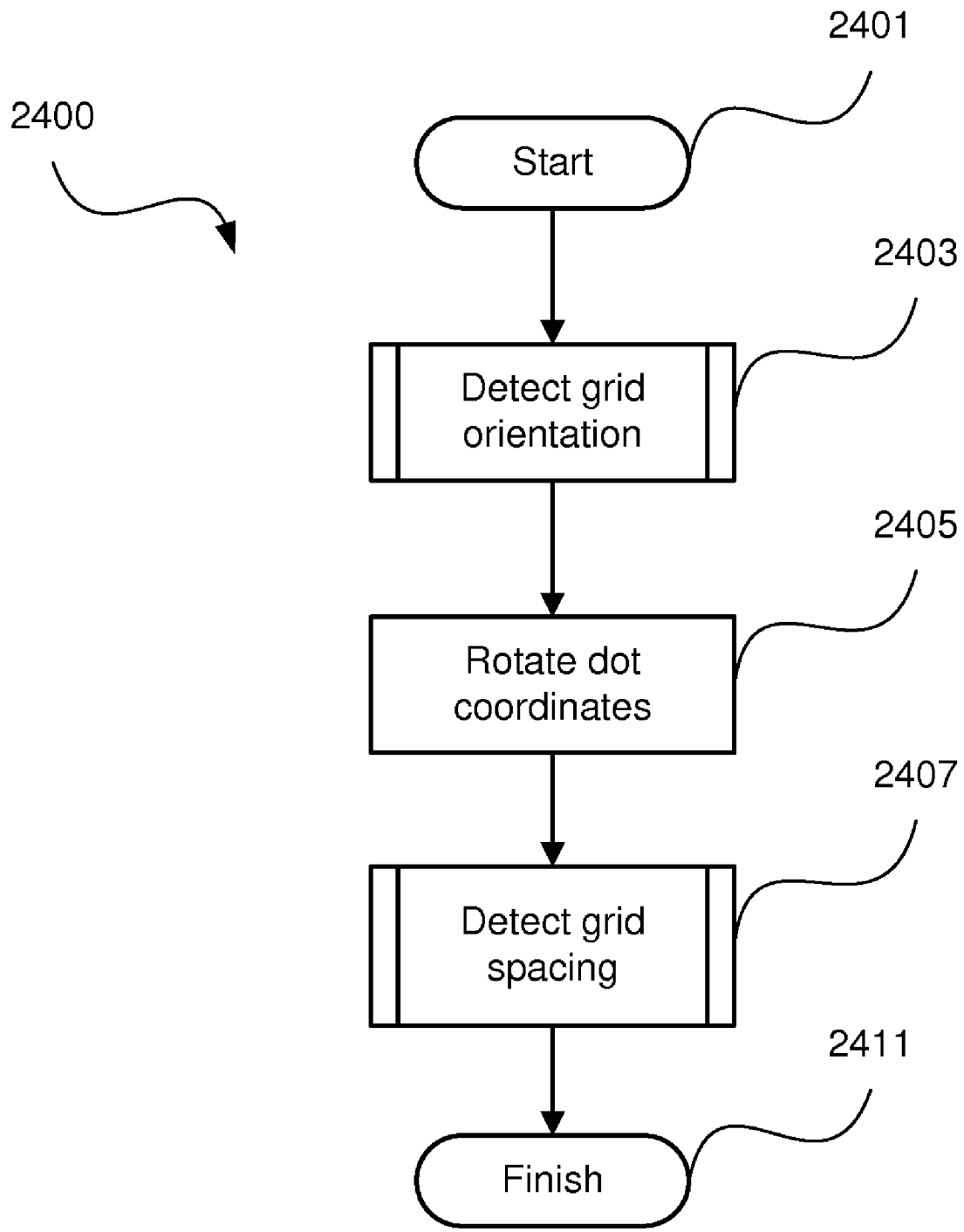
FIG. 24 shows a process for detecting the grid orientation, scale and translation in a grid of dots.

For each starting point, a process 2400 then detects the grid spacing and orientation corresponding to that starting point, using the dots in its neighbourhood. Process 2400 is now described in greater detail with respect to FIG. 24. The process begins at an initial step 2401. In a following step 2403 the grid orientation is calculated from the coordinates of the dots in the neighbourhood. This step will be described later in greater detail. Once the grid orientation has been calculated, a following step 2405 applies a rotation to all the dot coordinates in the neighbourhood. The rotation rotates by the grid orientation angle, so that the rotated dot coordinates have grid axes aligned with the x- and y-axes. Given the rotated dot coordinates, a following step 2407 calculates the grid spacing. A following step 2411 terminates process 2400.

Figure 25:
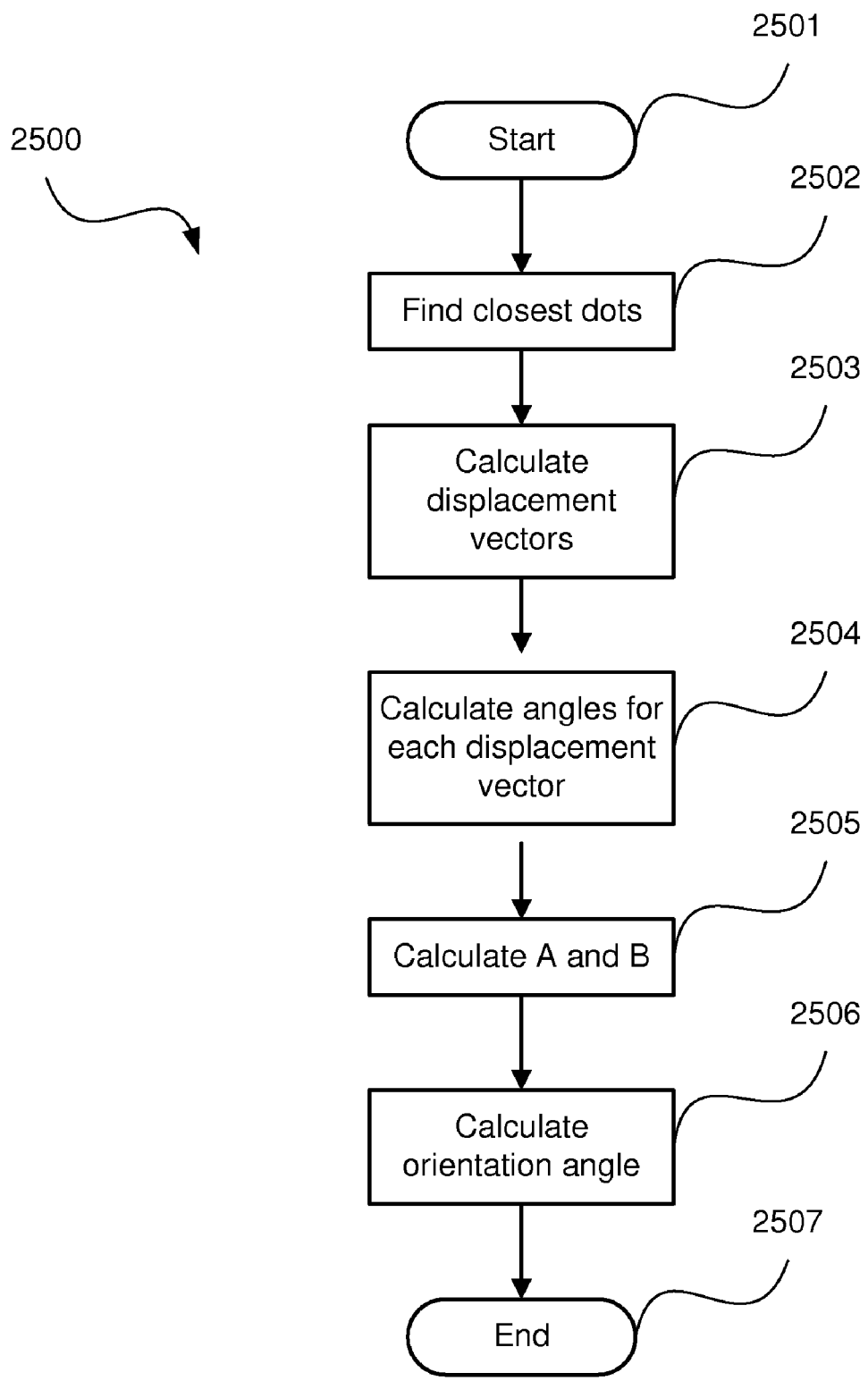
FIG. 25 shows a process for calculating the grid orientation.

Step 2403 is now discussed in greater detail. With reference to FIG. 25, step 2403 consists of a process 2500 that detects the grid orientation of the dots. The process begins at a step 2501.

A following step 2502 calculates, for each dot, what other dot is closest to it. This is done for every dot in the neighbourhood. Methods for finding the closest dot to a given dot will be known to those skilled in the art. One simple method is to consider each other dot in turn, calculate its distance to the given dot, and then take the dot where the calculated distance was least. In a preferred implementation, a faster method is used where the entire neighbourhood is divided into many 'buckets'. Each dot is assigned to the bucket that covers its location. To find the closest dot to a given dot, we start at the bucket that covers the given dot, look at all the dots in each of the buckets surrounding it, and take the dot closest to the given dot. If no dots exist in any of the surrounding buckets, the search is continued to the next nearest set of buckets radially outwards, and so on. This method greatly reduces the number of candidate dots considered for the closest dot.

A following step 2503 calculates the displacement vectors from each dot to its closest other dot, which was found in step 2502. Thus every dot has a corresponding displacement vector calculated for it.

A following step 2504 calculates, for each displacement vector calculated in step 2503, the angle of that displacement vector. The angle θ of a vector is well known to those skilled in the art, and may be calculated thus $$\theta = \text{atan } 2(y,x)$$

where x and y are the horizontal and vertical components of a vector. A following step 2505 calculates the values of variables A and B, defined as following:

$$A = \sum_i \cos(4\theta_i)$$

$$B = \sum_i \sin(4\theta_i)$$

where the $\theta_i$ are the angles of the displacement vectors found in step 2504. The sums are taken over all displacement vectors.

A following step 2506 then calculates the grid orientation angle φ using the formula:

$$\phi = \operatorname{atan} 2(B,A)/4$$

The grid orientation detected at step 2506 is therefore within the range of −45 degrees to 45 degrees. A following step 2507 finishes process 2500.

Figure 26:
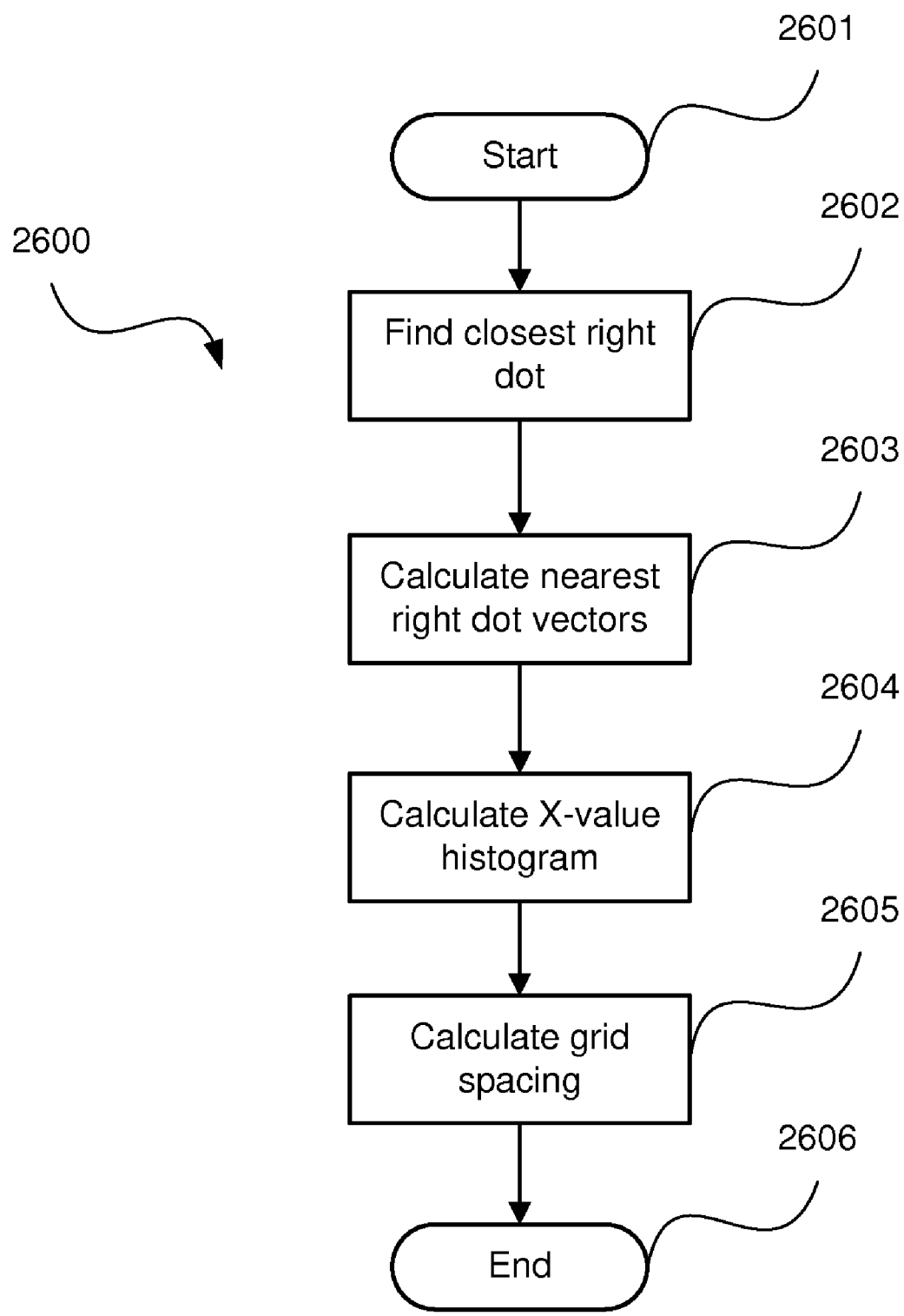
FIG. 26 shows a process for detecting the grid spacing.

Step 2407 is now considered in greater detail. Step 2407 executes a process 2600 as shown in FIG. 26. The process 2600 calculates the grid spacing. The process begins at step 2601.

A following step 2602 takes as input the list of rotated dots that have been detected in step 2405. For each dot (x, y), the nearest neighbouring dot to its right on the same horizontal row is found. To do this, the following heuristic is used. Every dot (a, b) that is not (x, y) is considered, and if (a, b) is outside the 90 degree sector to the right of (x, y), (a, b) is rejected. Formally, if $$a-x \leq 0 \text{ or } |a-x| \leq |b-y|$$

dot (a, b) is rejected. For the dots that are left, the dot that minimizes the function $$d(a,b) = |a-x| + 2|b-y|$$

is found. This dot is taken to be the dot to the right of (x, y) and stored in a list of right neighbour dots.

A following step 2603 takes each of the right neighbour dots (a, b) found and computes the difference vector (dx, dy) from (x, y); that is, $$(dx, dy) = (a,b) - (x,y)$$

Figure 27:
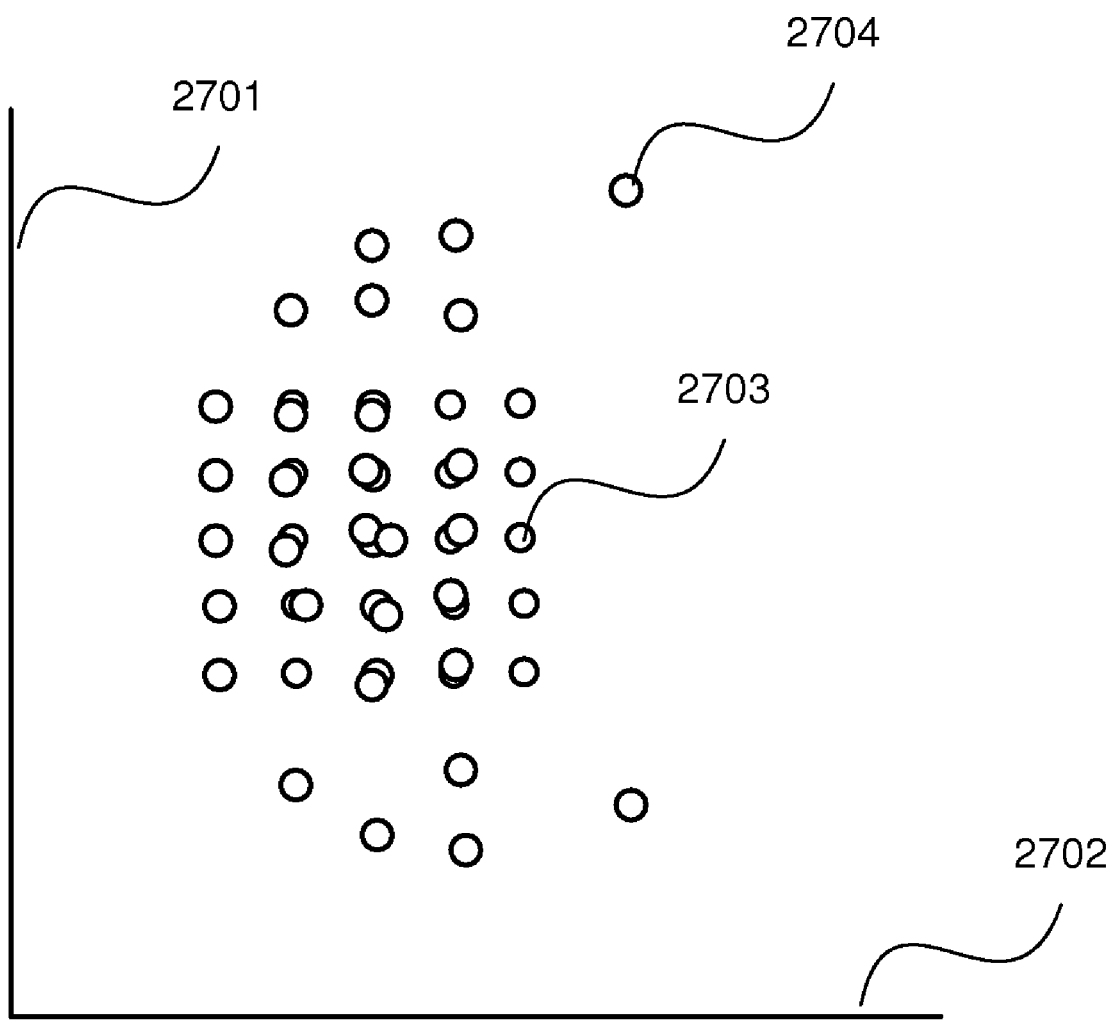
FIG. 27 shows a graph of a list of right neighbour difference vectors.

(dx dy) is stored in a list of difference vectors. To help visualize the result, FIG. 27 shows a graph of a list of difference vectors. 2701 is the y-axis, 2702 is the x-axis, and a circle (for example 2703) is the terminal point of a difference vector. One feature to noe is that due to noise and distortion in the grid, there will be some misplaced outlying points, such as 2704.

Figure 28:
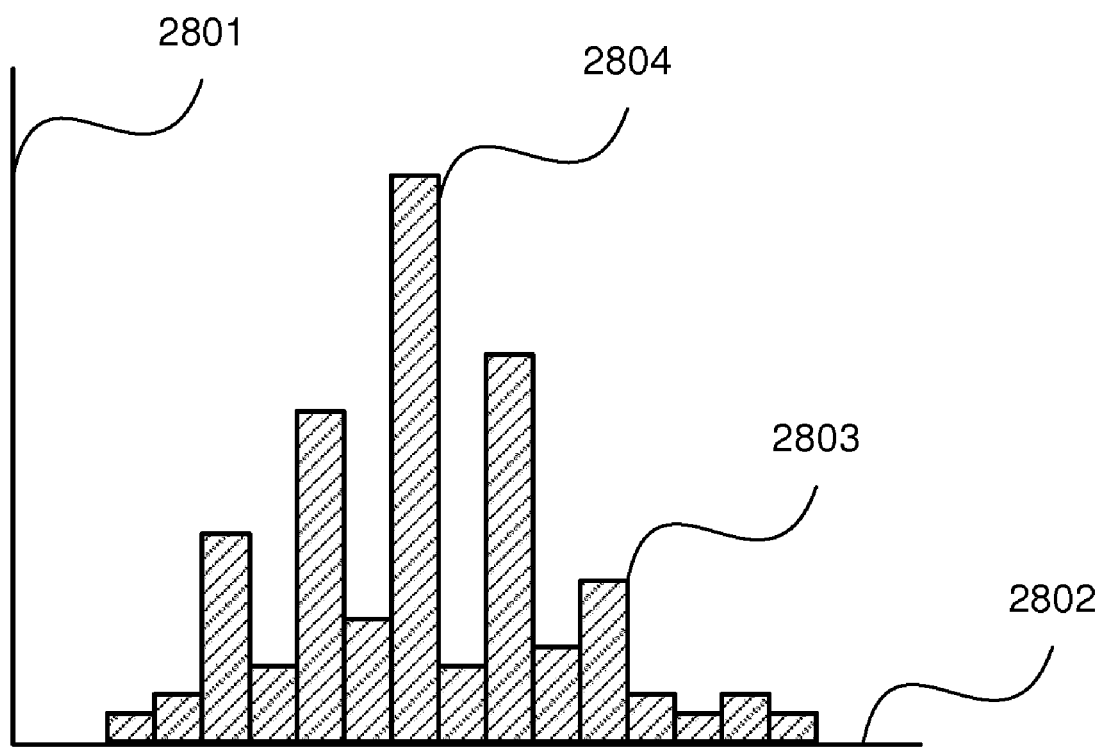
FIG. 28 shows a frequency histogram of x-values.

A following step 2604 takes the x-ordinate of each difference vector and creates a frequency histogram of the x-values. FIG. 28 shows the histogram. 2801 is the frequency axis, 2802 is the x-ordinate axis, and 2803 is a frequency bar. The size of each quantum in the x-ordinate axis should be related to the granularity of the dot coordinates. In the present system the quantum is chosen to be 0.5 of the grid co-ordinate axis system.

A following step 2605 uses this histogram to calculate the grid spacing. Note that most of the right neighbours dots will be clustered around the spacing of the grid; hence, the grid spacing is found by taking the x-value of the most frequent x-ordinate, shown as 2804.

A following step 2606 concludes the process 2600.

Returning to FIG. 9, following step 920, a step 930 grows out the grids, herein referred to as "grid navigation", from each starting point using a confidence measure.

Figure 11:
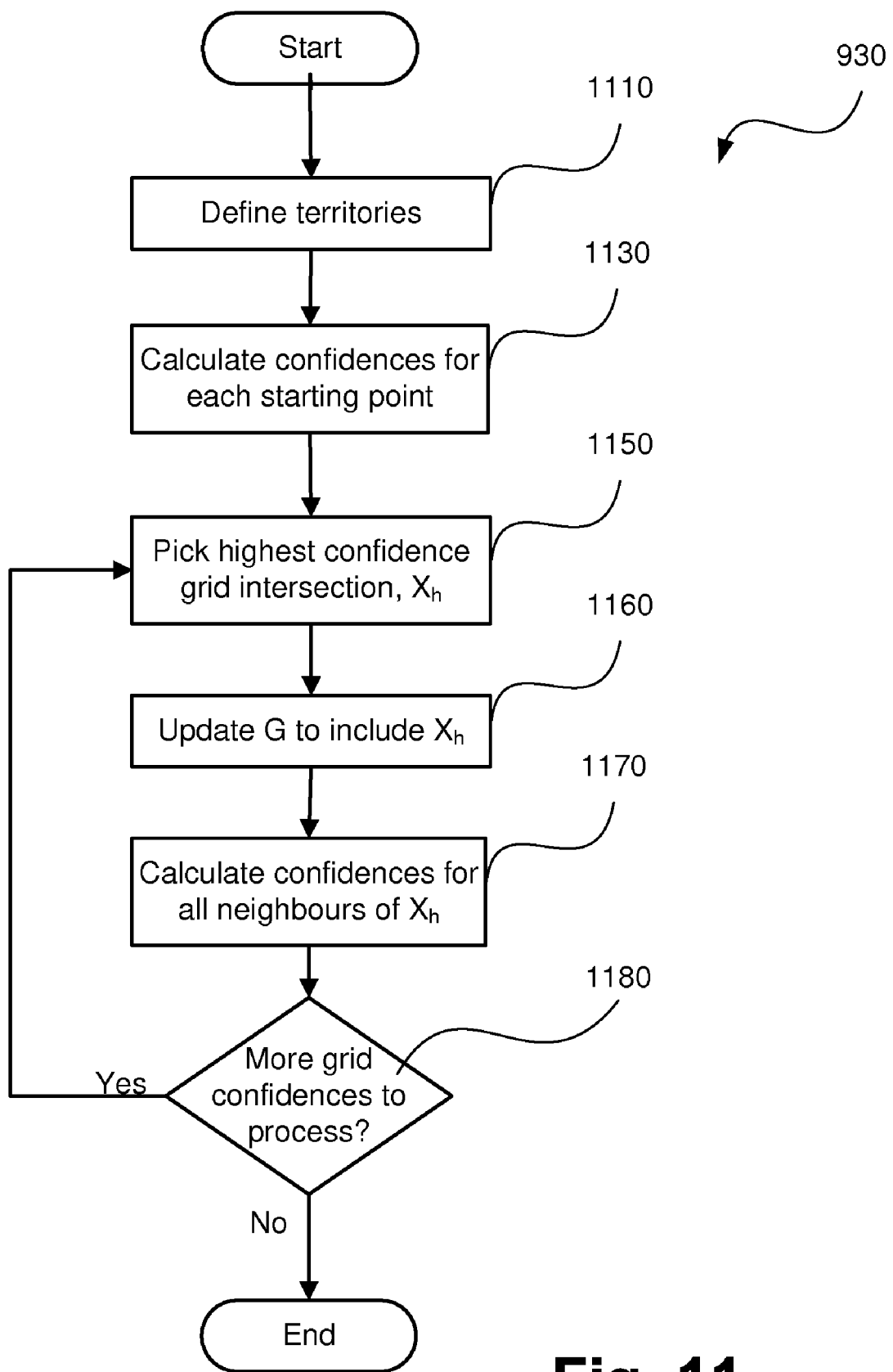
FIG. 11 is a flowchart showing the steps of growing out grids from the initial starting points using confidences.

FIG. 11 shows step 930, the method of grid navigation, in more detail. Firstly, step 1110 divides the image into territories. A grid discussed above typically includes a number of territories. All grid navigators can claim these territories. After a territory has been claimed, it can no longer be used by another grid navigator. Ideally, each territory should be small and have dimensions larger than the maximum grid spacing. In any event, the territories should have dimensions larger than the smallest grid spacing. In a preferred implementation, each territory is 32 pixels in width and height.

Step 1130 calculates the confidence and grid intersection closest to each starting point, using local grid-fitting. Grid-fitting will be described in further detail in the following section. The confidence measure is a measure of the algorithm confidence for the calculation of a grid intersection closest to a given pixel location. Each estimated grid intersection and its associated confidence value are added to a confidence pool. In a preferred implementation, the confidence, conf, is measured by:

$$conf = \min(|x\text{Offset}|, |y\text{Offset}|)$$

where |xOffset| is the length of the xOffset phasor (as defined in the 'local grid-fitting' section below); and

|yOffset| is the length of the yOffset phasor (as also defined in the 'local grid-fitting' section).

Next, step 1150 selects the grid intersection, $X_h$, with the highest confidence value from the confidence pool. Step 1160 then identifies the grid, G, that $X_h$ belongs to (based on the grid navigator of $X_h$), adds $X_h$ to grid G and removes $X_h$ from the confidence pool. Step 1170 identifies the approximate location of the four immediate neighbours of $X_h$ (using the grid spacing calculated at step 920) and uses local grid-fitting to calculate the estimated grid intersection of each neighbour and their associated confidence values. Each estimated grid intersection and its associated confidence value are added to the confidence pool. Additionally, the closest dot to the grid-intersection is found, and the displacement of the closest dot (herein referred to as an 'offset vector') from the grid-intersection is stored. It is possible that there is no dot close to the grid-intersection. At step 1180, if there are more grid confidences in the confidence pool above a minimum threshold value to process, processing proceeds to step 1150. Otherwise, the method 930 concludes. At this stage, the grids in the input image have been identified. Grid intersections that relate to a grid have been determined through the growing of grid intersections from starting points and through the use of confidence values.

Figure 12:
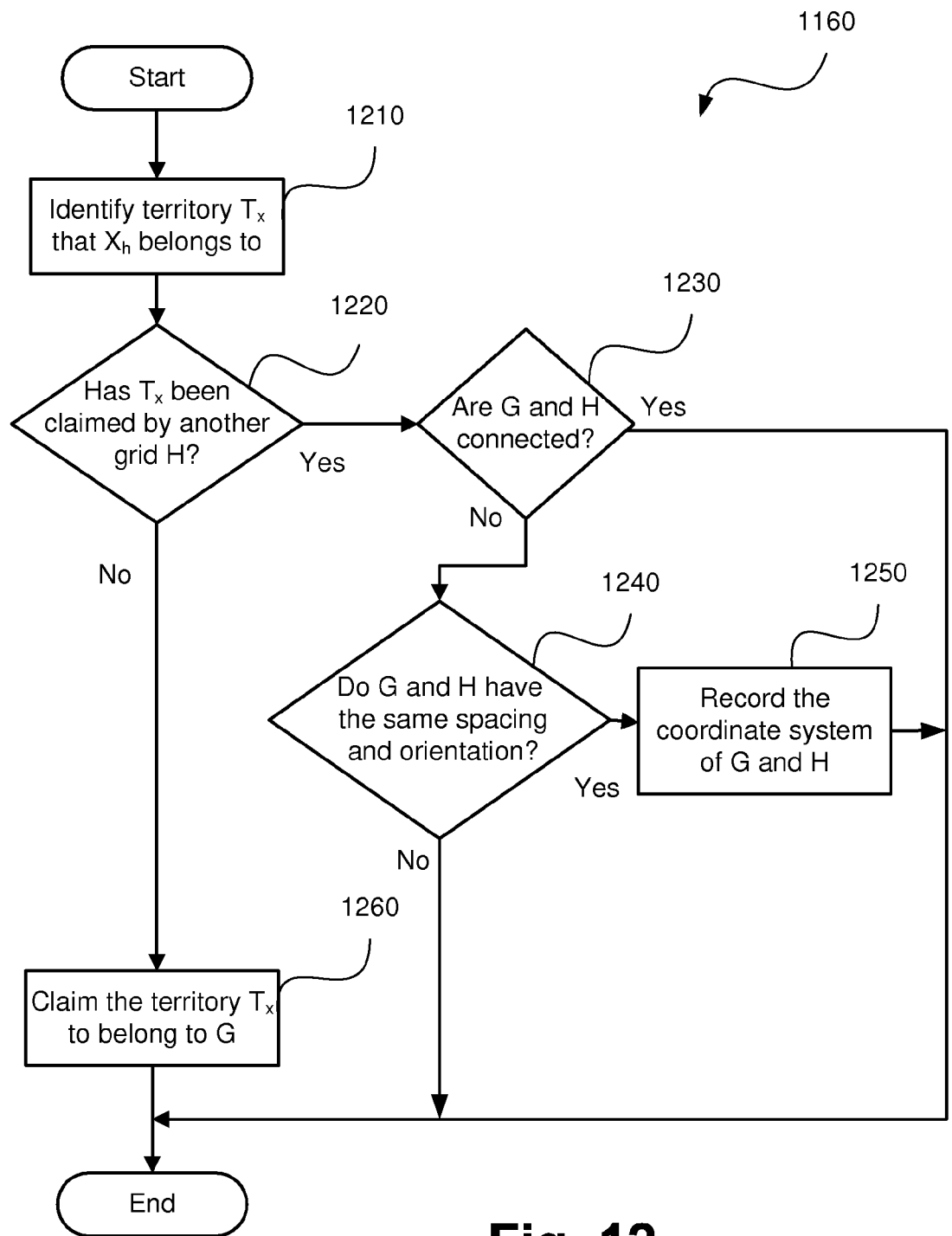
FIG. 12 is a flowchart showing the steps of adding a grid centre to an existing grid.
Figure 13:
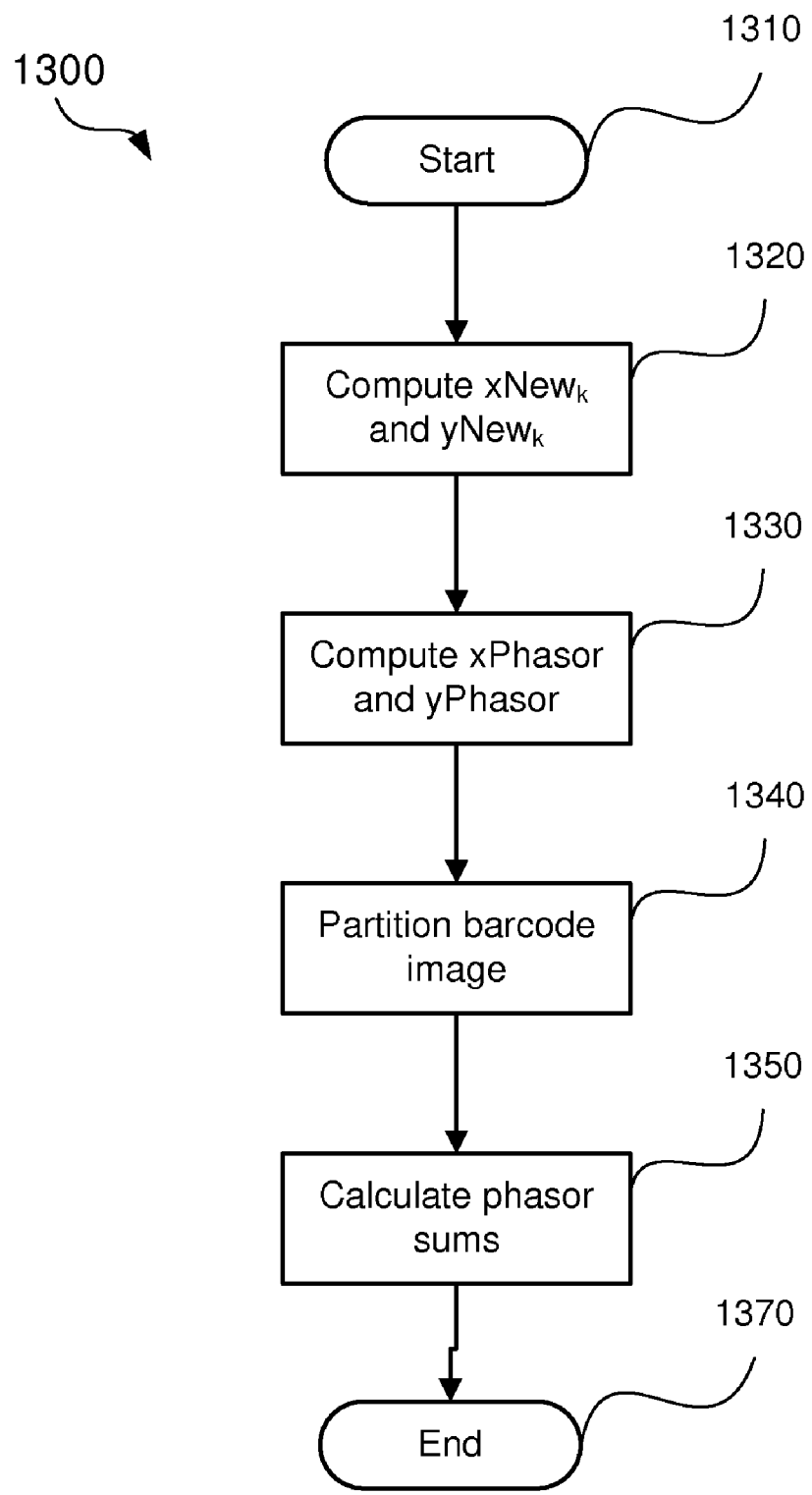
FIG. 13 is a flowchart showing the initialization steps for grid translation.

FIG. 12 shows step 1160, the method of updating grid G to include grid intersection $X_h$, in more detail. Processing starts at step 1210, to identify the territory $T_x$ that $X_h$ belongs to. At step 1220, if $T_x$ is unclaimed, processing proceeds to step 1260. Step 1260 claims the territory $T_x$ to belong to G and the method 1160 concludes.

At step 1220, if $T_x$ has already been claimed by another grid H, processing proceeds to step 1230. Step 1230 checks if grid G and H are already connected. If so, the method 1160 concludes. Otherwise, processing proceeds to step 1240, where grid G and H are checked if they have the same spacing and orientation. If so, step 1250 records the coordinate system of G and H at their meeting point. This connects grid G and H and synchronizes the different coordinate systems to a single coordinate system that is used by step 820 to locate regions within each grid. For example, each grid intersection in grid G has a local grid-coordinate. Similarly, each grid intersection in grid H has a local grid-coordinate. When grids G and H meet, the grid-intersections of grid H have to be relabelled such that the new grid-coordinates of H are local to grid G. If grid G and H have differing spacing or orientation, the method 1160 concludes.

FIG. 10B illustrates the output of the method for grid navigation. The method identifies two grids 1040 and 1050. Comparing FIG. 7B with FIG. 10B, the grid 1040 is composed of two adjoined dot patterns 720 and 730 placed at right-angles to each other. However, because the grid orientation detected in step 920 of FIG. 9 is within the range of 0 degrees to 90 degrees, the grid navigation is only able to identify 1040 as a single grid.

Step 820 in FIG. 8 operates to distinguish the two dot patterns 720 and 730 in grid 1040.

3.2 Local Grid-Fitting

The method for local grid-fitting is now described in more detail. Grid-fitting as described herein is a process by which the grid-intersections are found. The grid-intersection is found by examining a local region, and finding the translation of the grid that best fits the dots in the local region. The closest grid-intersection to an input point is then determined.

In grid-fitting, an initialization step is performed before the first grid-intersection is needed. This initialization step pre-computes some numbers. The step of estimating the grid-intersection uses the precomputed information.

The precomputed information depends on the grid spacing and orientation of the grid. Therefore, each grid navigator has its own store of precomputed information and has to perform its own initialization.

The initialization step 1300 is now described in more detail. The initialization process 1300, shown in FIG. 13, commences at step 1320. At step 1320, the process 1300 computes xNew$_k$ and yNew$_k$ for every dot ($x_k$, $y_k$) in the barcode image. In order that the grid spacing becomes $2\pi$ and the grid orientation is accounted for, the following relation is satisfied:

$$\begin{pmatrix} xNew_k \\ yNew_k \end{pmatrix} = \frac{2\pi}{gridSpacing} \begin{pmatrix} \cos\theta & \sin\theta \\ -\sin\theta & \cos\theta \end{pmatrix} \begin{pmatrix} x_k \\ y_k \end{pmatrix}$$

where $\theta$ is the grid orientation detected in step 1110.

In step 1330, the process 1300 computes the x- and y-phasors for every dot in the barcode image:

$x\text{Phasor} = \cos(x\text{New}_k) + j\sin(x\text{New}_k)$ $y\text{Phasor} = \cos(y\text{New}_k) + j\sin(y\text{New}_k)$ Here j is the square-root of minus-one.

Figure 14:
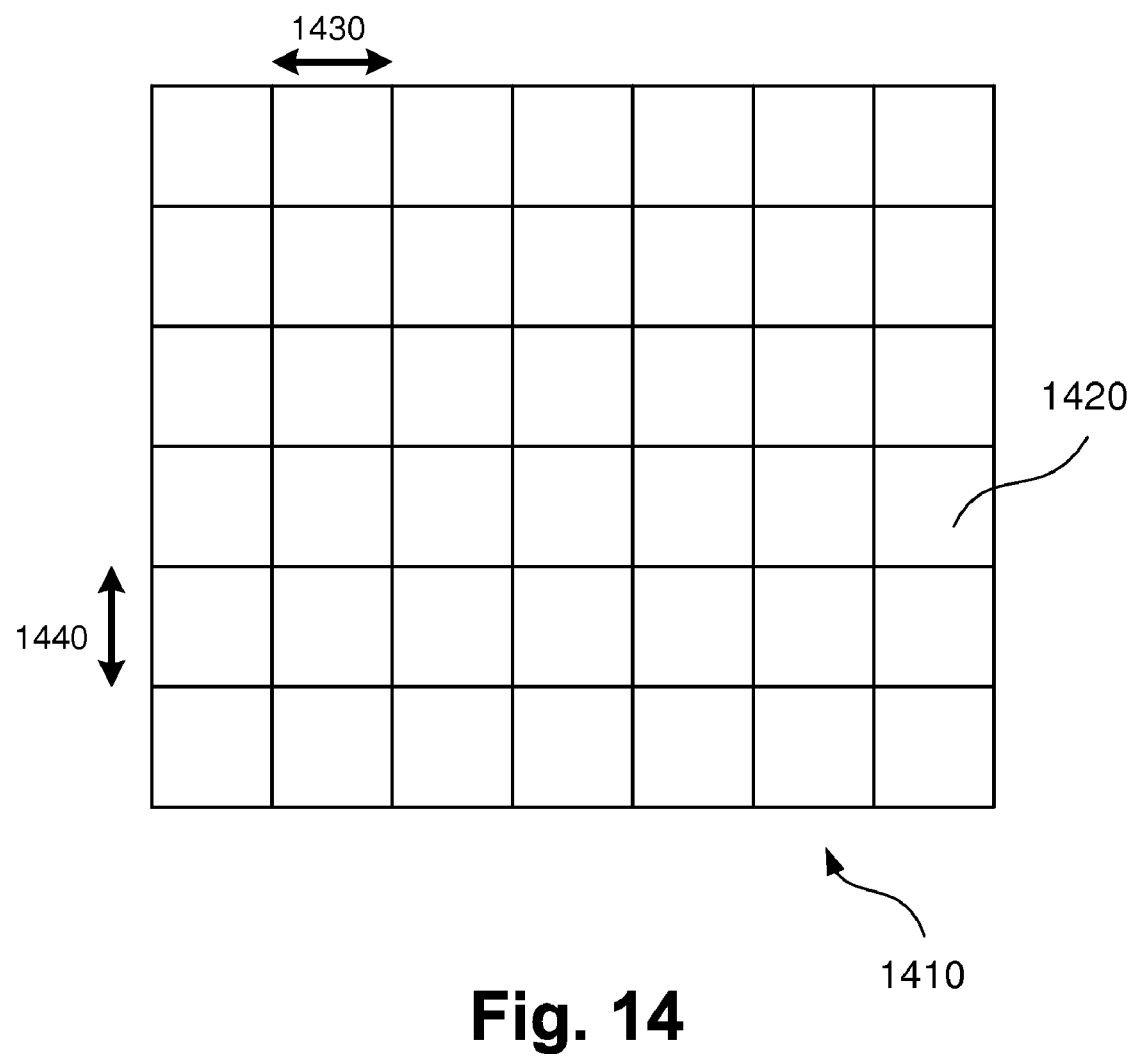
FIG. 14 illustrates a barcode image divided into phasor bins.

At step 1340, the barcode image is partitioned into phasor bins. In a preferred implementation, the phasor bins are 32×32 pixels in size, and tiled regularly across the image. For example, FIG. 14 shows a barcode image 1410, which is divided into phasor bins (e.g. 1420). The phasor bins have a vertical (y) size dimension 1440 and a horizontal (x) size dimension 1430. At step 1350, for each bin 1420, the process 1300 computes the sum of the x-phasors corresponding to the dots in the bin 1420. Similarly, for each bin 1420, the process computes the sum of the y-phasors. This concludes the initialization step 1300 of pre-computing information.

Figure 15:
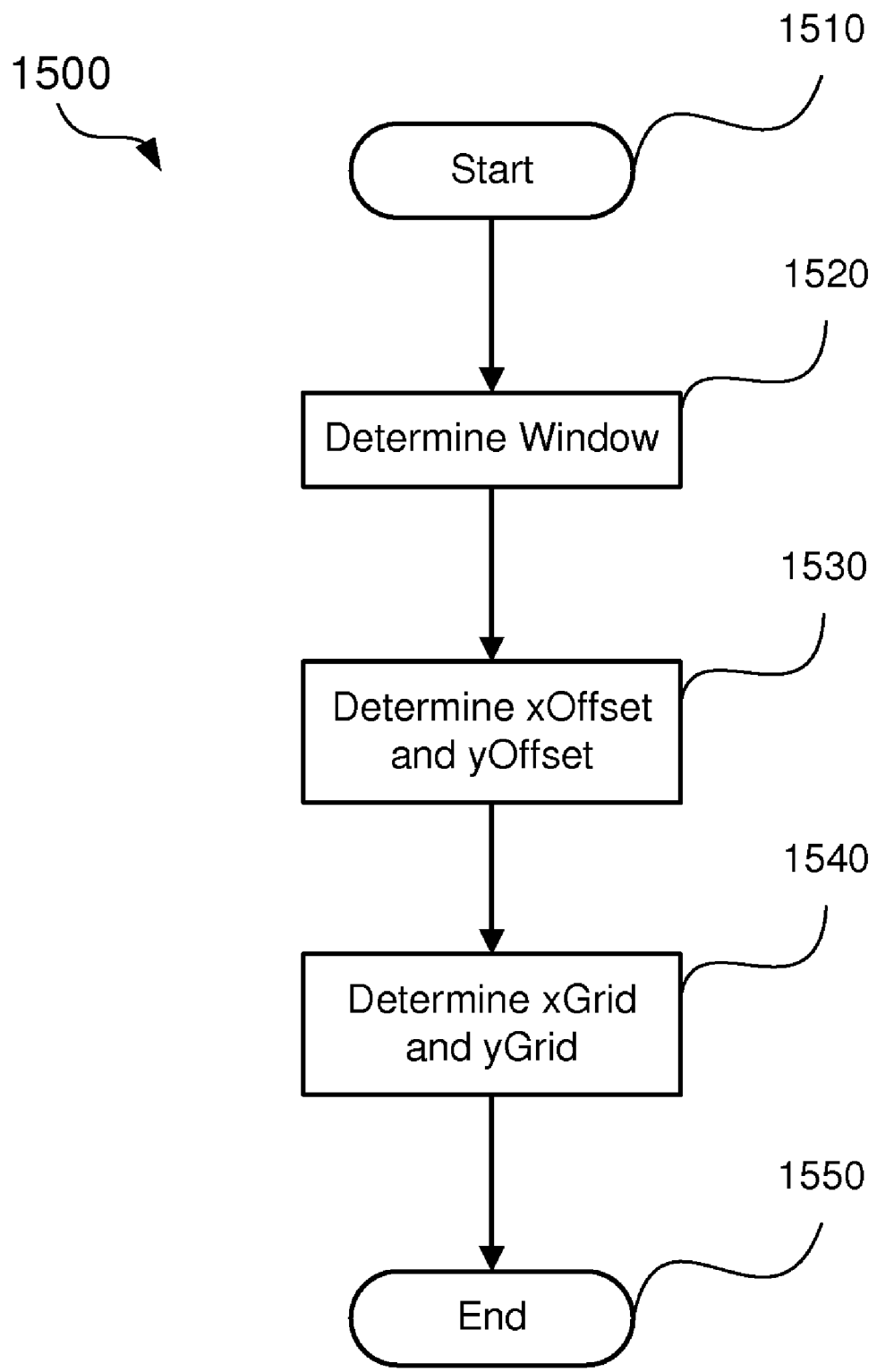
FIG. 15 is a flowchart showing the steps for grid translation.

FIG. 15 shows a process 1500 for computing the grid-intersection using the precomputed information. Suppose the closest grid-intersection is sought at a point ($x_c$, $y_c$). The method 1500 has an entry step 1510 and substantively commences at step 1520, where a window around the point ($x_c$, $y_c$) is determined. The window preferably has a size of 4×4 phasor bins, but other window sizes could be used. The window is determined to be the set of 4×4 phasor bins that have the point ($x_c$, $y_c$) closest to the centre. Second, at step 1530, the values of xOffset and yOffset are determined. xOffset is the sum of the x-phasor sums of the 4×4 phasor bins in the window. Similarly, yOffset is the sum of the y-phasor sums of the 4×4 phasor bins in the window.

Finally, step 1540 estimates the location of the closest grid-intersection. Denote the current pixel location by ($x_c$, $y_c$). The estimated grid intersection (xGrid, yGrid) is given by $$\begin{pmatrix} xr_c \\ yr_c \end{pmatrix} = \frac{2\pi}{gridSpacing} \begin{pmatrix} \cos\theta & \sin\theta \\ -\sin\theta & \cos\theta \end{pmatrix} \begin{pmatrix} x_c \\ y_c \end{pmatrix}$$

$xOffset_2 = xOffset(\cos(-xr_c) + j\sin(-xr_c))$ $yOffset_2 = yOffset(\cos(-yr_c) + j\sin(-yr_c))$ $$\begin{pmatrix} xGrid \\ yGrid \end{pmatrix} = \frac{gridSpacing}{2\pi} \begin{pmatrix} \cos\theta & -\sin\theta \\ \sin\theta & \cos\theta \end{pmatrix} \begin{pmatrix} xr_c + L(xOffset_2) \\ yr_c + L(yOffset_2) \end{pmatrix}$$

where $\theta$ is the grid orientation detected in step 1110.

After step 1540, the method 1500 concludes.

3.3 Region Finding

Step 820 is now discussed in greater detail with reference to FIG. 16 which shows the method of identifying multiple regions in a grid. The method 820, which merges region tiles together to form regions, commences at step 1610 where the input grid is divided into region tiles. FIG. 17 illustrates an input grid divided into region tiles. Each region tile (e.g. region tile 1705, 1730) has dimensions tx by ty, which is the size of an encoded tile. Each region tile has at most four boundaries. For example, region tile 1705 has region boundaries: 1710, 1715, 1720 and 1725. At step 1620, the merging cost for each region boundary is calculated.

The merging cost, mc, is a measure of the improvement of the overall error measure after the two regions of a region boundary are merged. Preferably:

$mc_{pq} = error_{pq} - error_p - error_q$ where:

$mc_{pq}$ is the merging cost to merge region p and region q;
$error_{pq}$ is the error of the combination of regions p and q;
$error_p$ is the error of region p; and
$error_q$ is the error of region q.

The error metric is calculated based on how dissimilar the region tiles in a region are to each other. Ideally, the similarity between region tiles is calculated by identifying the repeating areas within each tile. As described previously, each region tile has the same dimensions as an encoded tile. Thus, the small data portion 620 (herein referred to as the 'area of interest'), with dimensions cx by cy, is located somewhere in each region tile. The location of the area of interest is determined using aggregation and a boxcar filter.

Error calculations involve aggregating the region tiles of a region together. That is, the region tiles are merged into one region tile by combining the corresponding dots in each region tile. The size of the tiles is tx by ty, so that there are tx multiplied by ty tile positions. During tile aggregation, four aggregated values are calculated for each tile position in the aggregated region. The first value, agg_count, is the number of dots at the given tile position. Usually agg_count is equal to the number of region tiles in the region. However, if there is no corresponding dot at a given grid intersection (as identified by step 1170), the agg_count will be less than the number of region tiles in the region. agg_x is the sum of the x-offset values of the offset vectors at the given tile position. agg_y is the sum of the y-offset values of the offset vectors at the given tile position. Finally, agg_sqlen is the sum of the squared lengths of the offset vectors at the given tile position.

A boxcar filter is used to calculate the location of the area of interest. A score is calculated for each tile position, according to the formula:

$$\text{score} = \frac{\text{agg\_x}^2 + \text{agg\_y}^2}{\text{agg\_sqlen}}$$

If agg_sqlen is 0, the score at that tile position is 0. A boxcar filter sums the scores in all cx by cy areas of the aggregated tile. The 'area of interest' is the cx by cy area with the maximum score sum.

After each region merge, it may be necessary to re-calculate the location of the area of interest because a more accurate location may be obtained with more dots in the score calculations. This involves updating the agg_x and agg_y values for all tile positions in the newly merged region.

Once the location of the area of interest is found, the error metric is calculated using the dots within the area of interest. For each tile position in the aggregated region, the error is:

$$\text{agg\_error} = \frac{\text{agg\_sqlen} - (\text{agg\_x} * \text{agg\_y})^2}{\text{agg\_count}}$$

Thus, the error metric for the entire aggregated region tile (e.g. $\text{error}_p$) is the sum of the error values at each tile position. Initially, at step 1610, all regions have an error value of zero. This is because there is only one aggregated tile in each region when method 820 commences.

Next, step 1624 identifies the region boundary $B_{xy}$, located between two regions $R_x$ and $R_y$, with the lowest merging cost, $mc_{xy}$. Step 1628 checks if $mc_{xy}$ has a value below a threshold value MC_THRESHOLD. This maximum threshold value ensures that all regions that are merged will improve the overall error measure, rather than making the overall error measure worse. If $mc_{xy}$ is below the threshold, processing proceeds to step 1630. Otherwise, the method 820 concludes. The value of MC_THRESHOLD is preferably zero.

Figure 17:
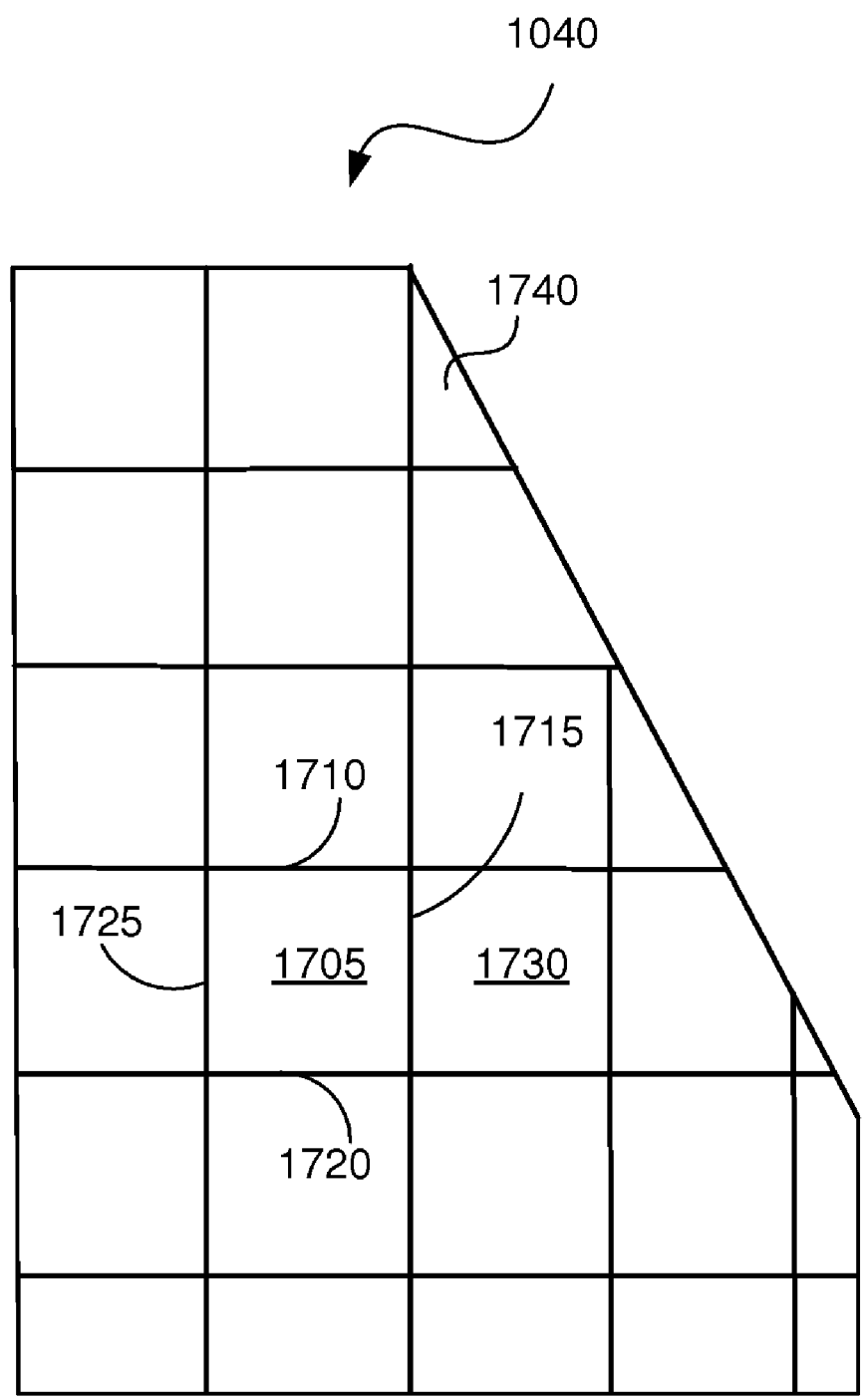
FIG. 17 shows an example of a grid divided into regions.
Figure 18:
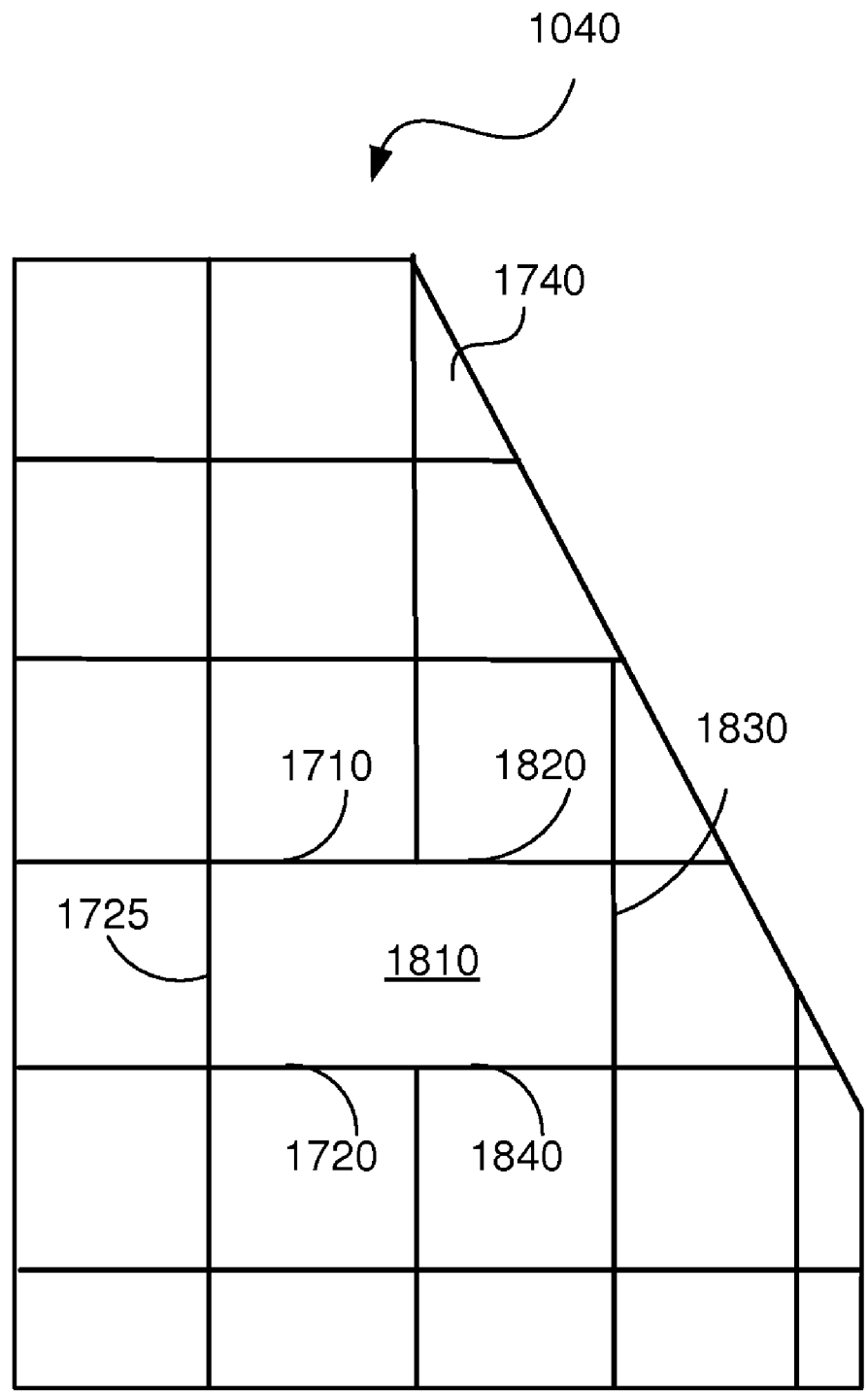
FIG. 18 shows an example of merging two regions in a grid together.

Step 1630 merges the two regions of $B_{xy}$ (i.e. region $R_x$ and $R_y$) into a single region, $R_{xy}$. FIG. 18 illustrates an example of an input grid 1040 with a merged region 1810. Referring to FIG. 17, step 1630 identified boundary 1715 as the boundary $B_{xy}$ with the lowest merging cost. Thus, region $R_x$ 1705 and $R_y$ 1730 are merged.

Next, returning to FIG. 16, step 1640 calculates the new merging cost for all the boundaries of the merged region $R_{xy}$. Referring again to FIG. 18, step 1640 calculates the new merging cost of boundaries 1710, 1820, 1830, 1840, 1720 and 1725.

At step 1650, if there are more region boundaries to process, processing proceeds to step 1630 to merge the next lowest merging cost boundary. Otherwise, the method 820 concludes.

Figure 16:
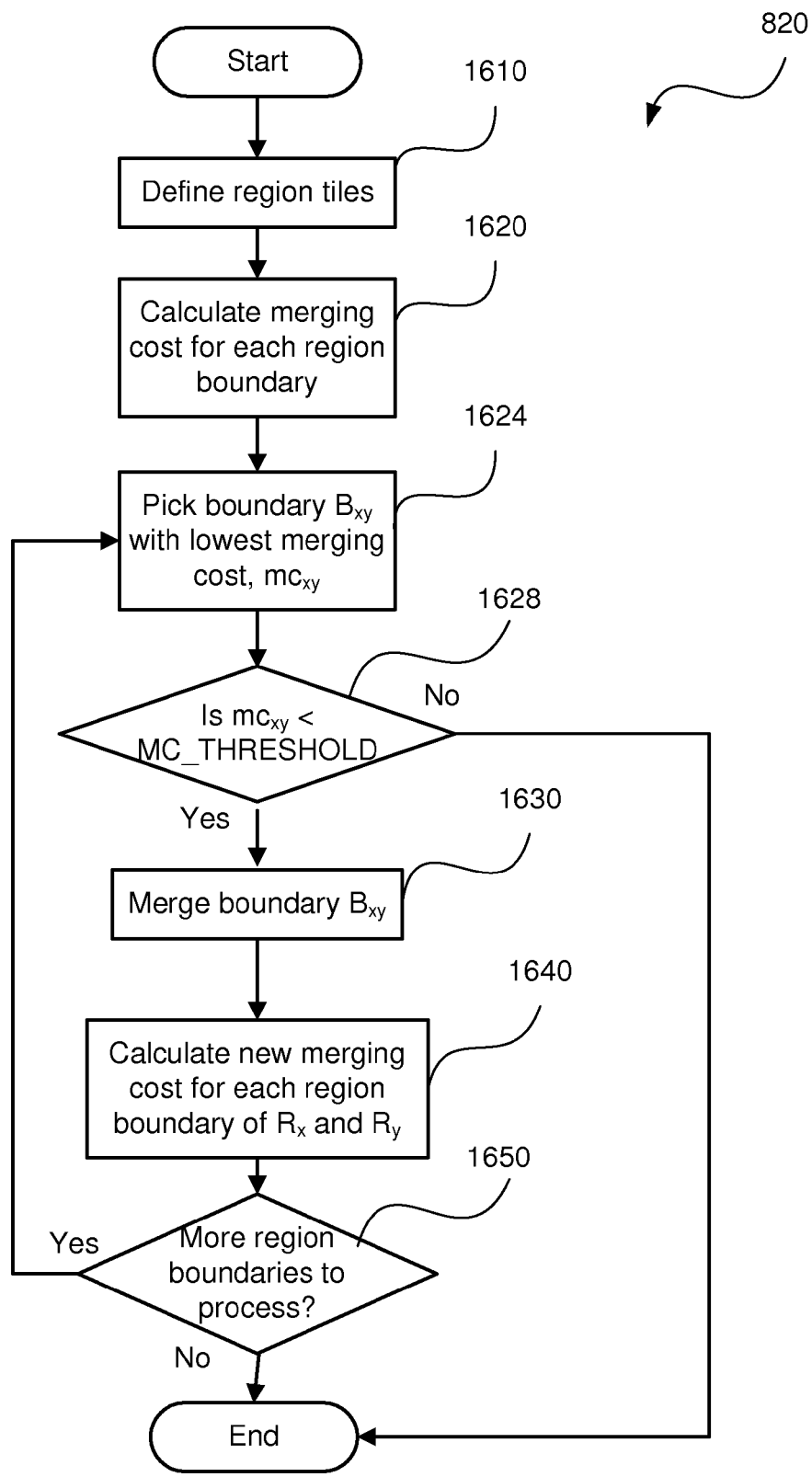
FIG. 16 is a flowchart showing the steps to detect multiple regions in a grid.
Figure 19:
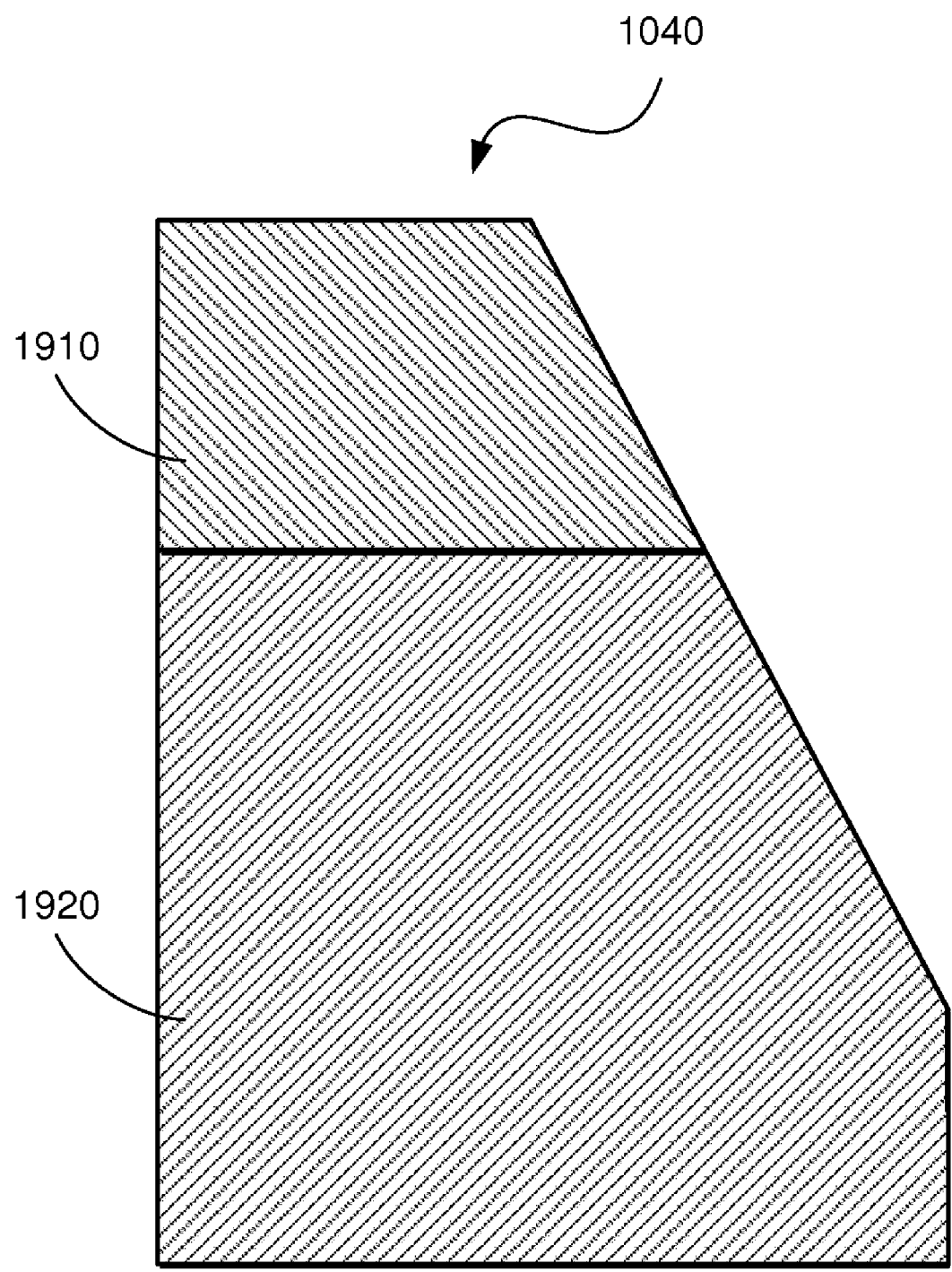
FIG. 19 shows an example of the regions that are detected in a grid.

FIG. 19 illustrates the output of the method 820 shown in FIG. 16 for detecting multiple regions in a grid. Grid 1040 consists of two dot pattern regions: region 1910 and region 1920 which are found to have the different data when the data is read using the same orientation for region 1910 and 1920.

3.4 Decode Regions

Each identified region is decoded by aggregating the region tiles in each region and using the aggregated dots in the area of interest (identified at step 1620 and 1640) to decode the original message.

In order to convert each aggregated offset vector into its corresponding digital data value, each grid square is divided into eight equal sized sectors, as shown in FIG. 20. The grid 2090, with grid centre 2095, defines eight sectors, where each sector represents a digital data value. Aggregated offset vector 2014, which represents aggregated dot 2012 falls in sector 2010. Referring again to FIG. 4, sector 2010 corresponds to the dot 401 having the value 403, which has a digital data value of 5 (ie. 101 binary). Similarly, an aggregated offset vector that falls in sector 2020, 2030, 2040, 2050, 2060, 2070 or 2080 corresponds to dots having values 7, 6, 2, 3, 1, 0 or 4 respectively.

Once each aggregated offset vector is converted to its digital data value, the binary representation of the values are appended in order (as shown in FIG. 5) to form the decoded message.

It is possible that the orientation of the region tiles is wrong, by a multiple of 90 degrees. This is because if the grid is turned by 90 degrees it still looks like a grid. Thus, the step 2506 for determining the grid orientation only returns angles between −45 and 45 degrees. If it is the case that the decoded message does not make sense, the orientation may have been detected incorrectly. (It may be possible to detect an incorrect message by the use of a checksum, or an error-correction step. Other methods are also possible.)

In the case that the orientation is wrong, the decoder can rotate the region tile, re-convert the offset vectors into digital data values, and append the values in the new order (as shown in FIG. 5). This can be done for all four orientations, until a correct decoded message is detected.

4. Extensions 4.1 Un-Tiled Dot Patterns

The present disclosure is not limited to identifying regions of tiled dot patterns. It is also possible to detect regions of un-tiled dot patterns. To identify un-tiled dot patterns, the error metric in the region finder will be based on the characteristics of a dot pattern, rather than looking for dots arranged in the same pattern.

For example, the error metric could be based on the brightness, size or shape (or a combination of pattern characteristics). That is, instead of aggregating region tiles (in step 1620 and 1640) to calculate the merging cost and error metric for a region, an alternate implementation can aggregate statistics on the brightness, size or shape (or a combination of these). These aggregated statistics will represent the similarity between region tiles and define the error metric for a region.

4.2 Optimized Grid Navigation

During grid navigation, it may not be necessary to use grid translation to locate all the grid intersections in a dot pattern. Instead, it may be sufficient to use grid translation to locate one in four grid intersections in a dot pattern.

Figure 21A:
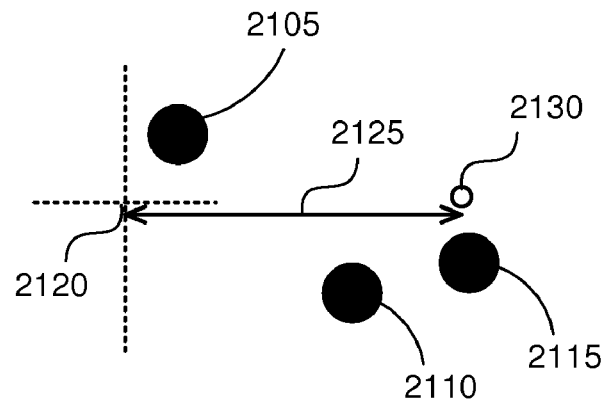
FIG. 21A illustrates an improvement for the method of grid navigation and estimating a neighbour location.
Figure 21B:
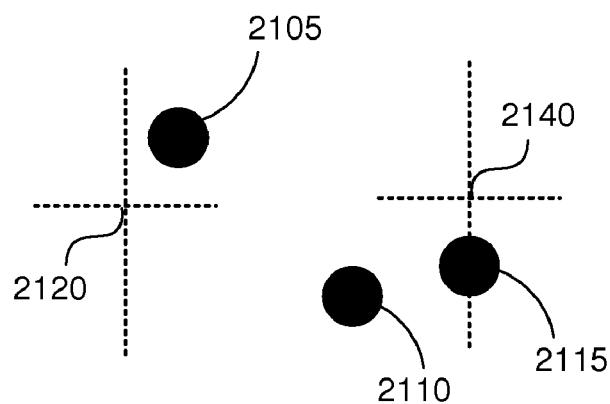
FIG. 21B illustrates an improvement for the method of grid navigation and using grid translation to identify a neighbour location.
Figure 21C:
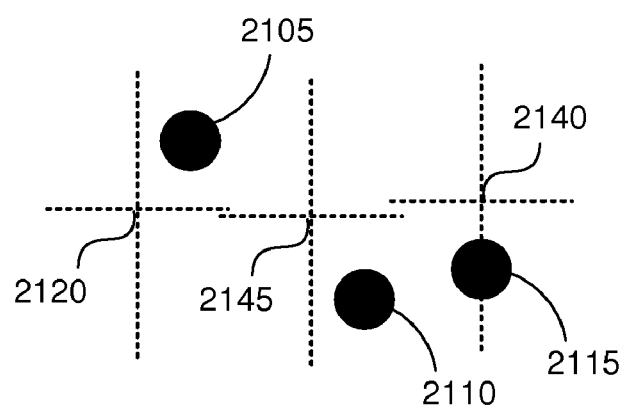
FIG. 21C illustrates an improvement for the method of grid navigation and interpolating a grid intersection location.

FIGS. 21A, 21B and 21C illustrate a method of having a reduced number of grid translation calculations during grid navigation. FIG. 21A shows an example of the grid navigator after step 1160. Various dots 2105, 2110 and 2115 have been identified by step 805, and dot 2105 is adjacent a grid intersection 2120. Instead of step 1170, the optimised grid navigation method calculates the confidences for all neighbours two grid spacings away from the current grid intersection. In FIG. 21A, a point 2130 represents an estimated location of the neighbouring grid intersection. The distance between the point 2130 and the grid intersection 2120 is represented by an arrow 2125, which is twice the value of the grid spacing. Next, FIG. 21B shows the grid intersection for the dot 2115 after grid translation has been performed on the point 2130. Processing of grid navigation then proceeds to step 1180 of FIG. 11.

Finally, if there are no more grid confidences to process, the resulting grid is interpolated with the missing grid intersections. FIG. 21C illustrates the interpolated location of the grid intersection 2145 of the dot 2110.

4.3 Alternate Grid Navigation

An alternative approach for the method of grid navigation is to always update the grid of each grid intersection when calculating confidences. This has the effect of always claiming the territories of all neighbours when processing the highest confidence grid intersection.

That is, in FIG. 11, step 1160 can be removed from this alternate method. Instead, a new step is created. This new step updates the grid N of a grid intersection $X_n$ (that $X_n$ belongs to) once its confidence is calculated. In a further alternate implementation, this additional step is performed after step 1130 (and before step 1150). Also, the additional step is performed after step 1170 (and before step 1180).

4.4 Ignoring Partial Tiles in Region Finding

In the method 820 for finding multiple regions in a grid, step 1610 defines the regions in a grid. The input grid can be of arbitrary size, thus there may be partial tiles 1740 during step 1610. In an alternative approach, partial tiles may be excluded from processing of the region finder. Additionally, tiles with a low dot density may be excluded because there may be a noisy background in that area that caused false positive detection of dots.

4.5 Identifying 'Area of Interest" in Region Finding

When calculating the new merging cost for each region boundary of a merged region in step 1640, it may not be necessary to calculate the location of the area of interest for each region boundary. For example, for a region boundary between a large region and a very small region, the location of the area of interest is not re-calculated. Instead, the existing location of the area of interest in the large region is used in determining the merging cost.

Furthermore, when identifying the area of interest, it is possible to calculate the score for every other cx by cy dot area in the aggregated region tile (i.e. a two times sub-sample of the aggregated region tile). This is because it may not be necessary to obtain an accurate location of the area of interest yet. However, if an accurate location is required, the output of the sub-sampling is used to perform more accurate score calculations for the location of the area of interest.

FIG. 22 illustrates the dots in a dot pattern that are used during the sub-sampling for this alternate implementation. The dot pattern shown in FIG. 22 is the same as that in FIG. 1. When identifying the area of interest in the dot pattern, a two times subsampling of the dots is used. That is, the darkened dots (e.g. 2210) are used in the box-car calculations. This has the effect of reducing the number of calculations performed during step 1640.

4.6 Optimized Local Grid-Fitting

In an alternate embodiment, phasor sums are calculated on demand. In general, each grid navigator will not need phasor information for the whole page. In particular, each grid navigator only needs phasor information for the parts of the page that it represents.

Therefore, the method 1300 of initialization for grid-fitting is modified to a single step, being step 1340, of partitioning the barcode image. The steps of calculating the phasor sums: steps 1320, 1330, and 1350 are not performed during initialization.

The phasor sums will be required in step 1530. If the phasor sum for a bin has not been calculated already, then steps 1320, 1330 and 1350 are performed for that bin. The resulting phasor sums are memorized for example by storing in the memory 2306/2309 until required for use. If the phasor sum for that bin is required in future, its value is not recalculated.

INDUSTRIAL APPLICABILITY

The above that the arrangements described are applicable to the computer and data processing industries where secure copying of documents having barcode representations is required.

The foregoing describes only some embodiments of the present invention, and modifications and/or changes can be made thereto without departing from the scope and spirit of the invention, the embodiments being illustrative and not restrictive.

The invention claimed is:

1. A method of decoding at least one barcode printed on a page, each said barcode comprising a set of marks modulated about a corresponding grid, the method comprising the steps of:
   (a) identifying a plurality of starting points on a scanned image of at least a portion of the page, said plurality of starting points having a predetermined distribution across the scanned image;
   (b) locating a first set of marks in a neighborhood of a first identified one of the starting points and locating a second set of marks in a neighborhood of a second identified one of the starting points;
   (c) estimating, for each of the first and second identified starting points, at least one property which defines the grid about which the corresponding set of marks is modulated;
   (d) determining whether the grid about which the first set of marks is modulated is the same as the grid about which the second set of marks is modulated based on at least one of the respective estimated properties;
   (e) identifying, if step (d) determines the grids to be the same, a plurality of regions in the grids each having a repeated group of the marks, and merging the grid regions sharing the same repeated group of the marks to be associated with one barcode; and
   (f) decoding, using the merged grid regions, the at least one barcode associated with the first and second sets of marks.

2. The method according to claim 1 wherein the grids are at least one of located and grown based on confidence measures.

3. The method according to claim 1 wherein step (d) comprises determining the grids to be associated with at least two barcodes if the one or more estimated properties of the grids are determined not to be the same.

4. The method according to claim 3 wherein the at least two barcodes are adjoining.

5. The method according to claim 1 wherein the at least one property is selected from the group consisting of grid spacing and grid orientation.

6. The method according to claim 1 wherein the modulated marks are spatially modulated about the grid.

7. A computer readable storage medium having a program recorded thereon, the program being executable by a computer apparatus to decode at least one barcode printed on a page, each said barcode comprising a set of marks modulated about a corresponding grid, the program comprising:
   code for identifying a plurality of starting points on a scanned image of at least a portion of the page, said plurality of starting points having a predetermined distribution across the scanned image;
   code for locating a first set of marks in a neighborhood of a first identified one of the starting points and locating a second set of marks in a neighborhood of a second identified one of the starting points;

code for estimating, for each of the first and second identified starting points, at least one property which defines the grid about which the corresponding set of marks is modulated; code for determining whether the grid about which the first set of marks is modulated is the same as the grid about which the second set of marks is modulated based on at least one of the respective estimated properties;

code for identifying, if the grids are determined to be the same, a plurality of regions in the grids each having a repeated group of the marks, and merging the grid regions sharing the same repeated group of the marks to be associated with one barcode; and code for decoding, using the merged grid regions, the at least one barcode associated with the first and second sets of marks.

8. The computer readable storage medium according to claim 7 wherein the grids are at least one of located and grown based on confidence measures.

9. The computer readable storage medium according to claim 7 wherein the code for determining further determines the grids to be associated with at least two barcodes if the one or more estimated properties of the grids are determined not to be the same.

10. The computer readable storage medium according to claim 9 wherein the at least two barcodes are adjoining.

11. The computer readable storage medium according to claim 7 wherein the at least one property is selected from the group consisting of grid spacing and grid orientation.

12. The computer readable storage medium according to claim 7 wherein the modulated marks are spatially modulated about the grid.

13. A computer apparatus for decoding at least one barcode printed on a page, each said barcode comprising a set of marks modulated about a corresponding grid, the computer apparatus comprising:

a processor and a memory, the memory storing a program executable by the processor to perform the decoding and a scanned image of at least a portion of the page; said program comprising:

code for identifying a plurality of starting points in the scanned image, said plurality of starting points having a predetermined distribution across the scanned image;

code for locating a first set of marks in a neighborhood of a first identified one of the starting points and locating a second set of marks in a neighborhood of a second identified one of the starting points;

code for estimating, for each of the first and second identified starting points, at least one property which defines the grid about which the corresponding set of marks is modulated;

code for determining whether the grid about which the first set of marks is modulated is the same as the grid about which the second set of marks is modulated based on at least one of the respective estimated properties;

code for identifying, if the grids are determined to be the same, a plurality of regions in the grids each having a repeated group of the marks, and merging the grid regions sharing the same repeated group of the marks to be associated with one barcode; and code for decoding, using the merged grid regions, the at least one barcode associated with the first and second sets of marks.

14. The computer apparatus according to claim 13 wherein the grids are at least one of located and grown based on confidence measures.

15. The computer apparatus according to claim 13 wherein the code for determining further determines the grids to be associated with at least two barcodes if the one or more estimated properties of the grids are determined not to be the same.

16. The computer apparatus according to claim 15 wherein the at least two barcodes are adjoining.

17. The computer apparatus according to claim 13 wherein the at least one property is selected from the group consisting of grid spacing and grid orientation.

18. The computer apparatus according to claim 13 wherein the modulated marks are spatially modulated about the grid.

* * * * *